(12) United States Patent
Berkowitz et al.

(10) Patent No.: US 10,958,074 B2
(45) Date of Patent: Mar. 23, 2021

(54) DISTRIBUTED ENERGY STORAGE SYSTEM AND METHOD OF DISTRIBUTING ENERGY

(75) Inventors: Donald S. Berkowitz, Redmond, WA (US); David Porter, East Troy, WI (US); Terrence Bellei, Lake Forest, IL (US); James W. Sember, Burlington, WI (US); Stephen Williams, Franklin, WI (US)

(73) Assignee: S&C Electric Company, Chicago, IL (US)

( * ) Notice: Subject to any disclaimer, the term of this patent is extended or adjusted under 35 U.S.C. 154(b) by 1627 days.

(21) Appl. No.: 14/374,833

(22) PCT Filed: Feb. 1, 2012

(86) PCT No.: PCT/US2012/023422
§ 371 (c)(1),
(2), (4) Date: Jun. 29, 2015

(87) PCT Pub. No.: WO2012/106389
PCT Pub. Date: Aug. 9, 2012

(65) Prior Publication Data
US 2016/0118795 A1 Apr. 28, 2016

Related U.S. Application Data

(60) Provisional application No. 61/438,525, filed on Feb. 1, 2011, provisional application No. 61/438,507, filed on Feb. 1, 2011, provisional application No. 61/438,517, filed on Feb. 1, 2011, provisional application No. 61/438,534, filed on Feb. 1, 2011.

(51) Int. Cl.
*H02J 3/32* (2006.01)
*G05B 15/02* (2006.01)

(52) U.S. Cl.
CPC .............. *H02J 3/32* (2013.01); *G05B 15/02* (2013.01)

(58) Field of Classification Search
None
See application file for complete search history.

(56) References Cited

U.S. PATENT DOCUMENTS

2002/0041126 A1* 4/2002 Provanzana ............. H02J 3/28
307/48
2008/0040479 A1 2/2008 Bridge et al.

FOREIGN PATENT DOCUMENTS

WO 0231954 A1 4/2002

OTHER PUBLICATIONS

International Search Report and Written Opinion for International Application No. PCT/US2012/023422 dated Oct. 17, 2012. (13 pages).
Australian Examination Report for Australian Application No. 2016250369 dated Aug. 24, 2018. (3 pages).

* cited by examiner

*Primary Examiner* — Charles D Garber
*Assistant Examiner* — Steven M Christopher

(57) ABSTRACT

This patent describes embodiments of systems, apparatus and methods to provide improved control and coordination of a multiplicity of electric distribution grid-connected, energy storage units deployed over a geographically-dispersed area.

21 Claims, 18 Drawing Sheets

Notes: 1) Voltage disturbance on one or more phases is detected.
2) Load Fault has an increase in Lagging VARS from the utility and/or an increase in real power. Calculate as described in text.
3) All three voltages are good and in synchronism with the UPS or Microgrid phases.

DISTRIBUTED ENERGY STORAGE SYSTEM AND METHOD OF DISTRIBUTING ENERGY

TECHNICAL FIELD

This patent provides apparatus and methods to control and coordinate a multiplicity of electric distribution grid-connected, energy storage units deployed over a geographically-dispersed area.

INTRODUCTION

This patent describes embodiments of systems, apparatus and methods to provide improved control and coordination of a multiplicity of electric distribution grid-connected, energy storage units deployed over a geographically-dispersed area. The units may be very similar to those described in U.S. Pat. No. 6,900,556 and commonly referred-to under names such as Distributed Energy Storage (DES). An alternative design of units that may be adapted, used, deployed or controlled in accordance with the embodiments herein described is described in U.S. Pat. No. 7,050,311 and referred-to as an "Intelligent Transformer". In summary, these units are self-contained energy storage systems consisting typically of a storage battery capable of holding 25 kWH of energy or more, an inverter, and a local control system with a communication interface to an external control system responsible for coordinating their function within the distribution grid. Under sponsorship of the Electric Power Research Institute (EPRI), the functional requirements for a very simple control system for coordinating the operation of these units have been cooperatively developed and placed in the public domain.

The primary function of the DES unit is to assist the utility in reducing peak demand (referred to commonly as "peak shaving" or "load following") to defer or eliminate a regional need for additional generating capacity, although the DES unit has many other valuable features. These include the ability to provide reactive power compensation, to provide backup power for stranded customers when the main source of supply is temporarily unavailable, and to provide frequency support (ancillary services). An extensive description of the requirements of the basic DES unit, from the customer (electric distribution utility) point of view is contained in the EPRI DES Hub and Unit Functional Requirements Specifications. Other functions allow the DES unit to facilitate the connection of various renewable energy sources into the grid. This includes providing energy storage or buffering during periods of weak demand, and conversion from DC to AC and AC to DC.

The development of these units has been prompted by the very recent emergence of low cost, highly-functional battery storage systems capable of many hundreds of charge/discharge cycles, superb charge density characteristics and temperature performance. A second enabling technology has been the availability and low cost of highly-reliable solid-state inverter systems, and a third technology is that of modern, high-bandwidth communications. It should be noted that although the enabling technologies have involved battery based storage systems, future energy storage could be in fuel cells or any other means for storing and retrieving electric energy and may also include distributed generation technologies in combination with or in lieu of storage. The nature of these alternative storage and generation technologies would have little bearing on most of the challenges or solutions mentioned in this disclosure.

As a result of the rapid emergence and convergence of these new technologies and others, little attention has been placed on how DES could be leveraged to meet other important capacity constraints in the distribution grid. That is, not all capacity constraints are related to peak demand for generation capacity. For example, the distribution system is fed from distribution substations, and the transformers in these substations are extremely costly and difficult to replace. These transformers convert power provided at transmission or sub-transmission voltages of (typically) 69 kV and above to the voltages required for economic distribution of electricity to the utilities end customers. Capacity constraints in these transformers, or loss of capacity due to end of life or other operational issues, can create overheating (hot spots), leading to unexpected failure and concomitant risk of service interruption.

Another capacity constraint is the distribution feeder itself, particularly in the most-heavily utilized sections near the substation. In metropolitan areas in particular, feeders typically exit the substation underground and continue underground, in cableways or ductwork, for distances of hundreds of feet to several miles. Underground, high-voltage cable is very expensive, heat sensitive and replacement is even more problematic than substation transformers.

As mentioned above, a historical purpose of DES is peak flattening or shaving to serve the needs of generation (regional needs). In that sense, DES, when deployed as large numbers of units, is often referred-to as a "Virtual Power Plant". Although DES could also be used to reduce transformer or feeder peak loading, the strategies and methods for controlling loading at these three points, using DES are different. For example, a regional need to reduce load is considered a three-phase total energy target. There are no phase-specific requirements, and within reason, individual differences or imbalances from phase-to-phase are not considered a concern. On the other hand, a substation transformer capacity limitation is inherently phase-specific. For example, using DES units, a capacity limitation on Phase A, being specific to Phase A, can only be addressed by reducing loading on Phase A. However, a DES unit downstream from the transformer on any feeder could discharge energy to reduce load as long as it was on Phase A. In contrast, a capacity limitation sensed at the head of a single phase of a feeder can only be addressed by shifting load to DES units on that phase and on that feeder.

There are several other complications to DES energy dispatch. It's possible that multiple capacity constraints, particularly at times of near brownout or blackout conditions, may exist simultaneously. Under this scenario, complex decision-making may be necessary to prioritize and mediate the various constraints. Energy storage management is also a concern. Since these units are geographically dispersed there is a need to level out the usage of the units to prevent over-utilizing or exclusively-utilizing specific units, requiring premature battery replacement in those units, while failing to gain benefit from the investment in other units.

The deployment of new energy sources near the energy consumer, under direct control of the utility, presents other opportunities for improvement in power distribution capacity management as well. Historically, capacity management has been primarily based upon static, worst-case estimates of circuit loading applied to models of electrical characteristics of the distribution system. The fundamental goal of this analysis is to protect the electrical components from damage due to overheating. However, once the capacity, measured in amperes or watts, has been established, the primary monitoring, if any, is based on real-time measurements of current or power rather than on heat. In overhead distribution, where the load is carried on individual conductors consisting of bare wire, the analysis is relatively accurate and foolproof.

The analysis of capacity based on component overheating is much more complicated when the components are packaged or in some way thermally constrained. For example, the thermal analysis of power flow and capacity of a substation transformer is extremely complex. The individual windings of the transformer are typically immersed in oil, adjacent to, and influenced by the other windings, and affected by very complex electrical phenomenon such as the internal absorption of power flow harmonics, circuit imbalance, power factor and aging of components. As a result, capacity estimates of the transformer must be de-rated to account for these various influences. Because of the substantial expense and customer service impacts of a transformer failure, these derating factors tend to be very conservative. Due to the inherent variability of the above factors, even with the best design tools, the true, real-time capacity of the distribution system can only be guessed. In the case of the substation transformer, "hot spot" temperature monitoring (see, for example U.S. Pat. Nos. 4,362,057 and 6,727,821) can be applied to determine exactly when the transformer is being pushed to its true limit. However, without the ability to immediately reduce load when this point is reached, the distribution system operator must either allow the transformer to be damaged and risk catastrophic failure, or temporarily disconnect customers from service. Strategic application of load-side energy from the substation or distributed storage can reduce or prevent such dire circumstances from occurring.

The challenge of estimating and monitoring the capacity of underground feeder is even more complex than of the substation transformer. Dense runs of insulated conductor in conduit, in confined air spaces, adjacent to other potentially heat-generating cable, surrounded by thermally insulating earth, can create unpredictable and unexpectedly-high operating temperatures. As a result, special thermo-electric simulation programs have been developed such as the Cyme Corporation's CYMCAP™, to assist distribution capacity planning engineers with the task of establishing more accurate cable capacity limits. Even with sophisticated programs such as CYMCAP™, precise cable capacity estimation is difficult for a variety of reasons such as variations in the thermal insulating properties of the earth along the feeder.

For underground feeders, a relatively new technology called Distributed Temperature Sensing (DTS), based on fiber optic cable embedded in or placed adjacent to the underground cable, enables the real time feeder temperature to be measured every few feet along the underground cable (see for example U.S. Pat. Nos. 4,362,057 and 4,576,485). With DTS and its associated substation instrumentation, real-time thermal monitoring of the entire underground feeder section can be accomplished. Processing capabilities of the instrumentation include capabilities similar to CYMCAP™, allowing the thermal data to be converted internally into much more-precise real time estimates of cable capacity. As with the capabilities of transformer hot spot monitoring, lacking the ability to immediately reduce load when the real-time thermal capacity is reached, the distribution system operator must either allow the cable to be damaged and risk catastrophic failure, or temporarily disconnect customers from service. However, unlike transformer overloading that could be mitigated with substation energy storage, feeder overloading can only be mitigated by reduction of load (such techniques are usually referred to as "demand reduction" or DR) or generation of energy on the feeder using a system such as distributed storage.

The combination of a new means to selectively reduce distribution system loading, combined with the technologies of thermal sensing systems could allow for new, "semi-closed loop" control of the electrical distribution supply system based upon control of energy to meet thermal loading requirements. Such a control system should respond to capacity constraints at all three levels (regional, substation transformer and feeder capacity), even if present simultaneously, should be capable of optionally using the new temperature sensing technologies, and should attempt to even the wear due to repeated discharge/charge cycles over all storage units in the system.

Yet another area where DES can be of value is in the area of reactive power compensation (RPC), more broadly referred-to as Volt/VAR control. Many systems have been disclosed for providing improved voltage and reactive power control on the distribution feeder. The components distributed along the feeder for RPC consist entirely of fixed and switched capacitor banks, providing large, single blocks of three-phase RPC. The nominal sizes of these banks range from 600 to 1,800 kVAR, with the most typical size being 1,200 kVAR. DES units, with their embedded inverters and sophisticated internal control systems, are capable of providing RPC as well as real power output. This is referred-to as "four quadrant control" since any combination real and/or reactive power can be transferred to/or from the connected distribution system. Mathematically, real and reactive power both can be generated or consumed, with the practical restriction that the magnitude of the vector sum of the two cannot exceed the nameplate output rating of the DES unit. However, due to the small size of the DES units, even with only RPC active, the total compensation on a feeder is only slightly larger than a single 1,800 kVAR switched capacitor bank. During peak loading, when DES is needed for real power peak shaving, very little residual RPC is available. However, at all other times, the full power rating of each DES unit can be applied to RPC at a very low cost. Furthermore, unlike traditional switched capacitor banks, DES units that are deployed on individual phases, can be dispatched to balance the RPC across phases. Control systems attempting to leverage the ability of DES to provide RPC must carefully prioritize demand such that RPC only utilizes the residual RPC after real power output has been dispatched.

DETAILED DESCRIPTION

Figure 1A:
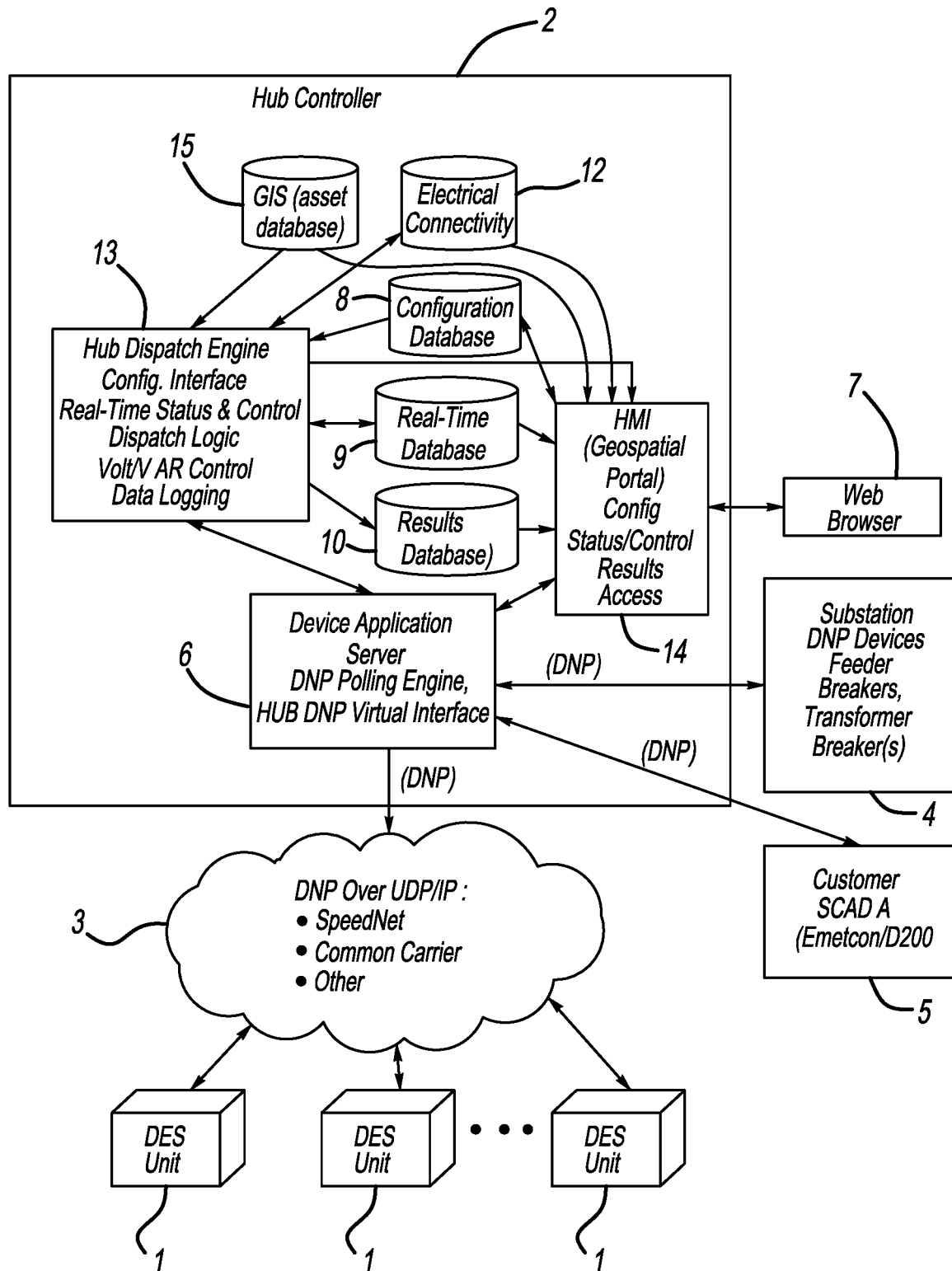
FIG. 1a illustrates an embodiment of a distributed energy storage (DES) system.

An embodiment of a DES system is shown in FIG. 1a. Connectors depicted in the drawings indicate information exchange between components. The DES units (1) are assembled or prepackaged components or boxes including energy storage modules (batteries in the present system). The system could use virtually any form of energy storage, including kinetic, capacitive, chemical, etc., as long as it is locally-convertible by the unit to electrical energy on demand. The DES units also include a four-quadrant inverter and digital computer-based control with the ability to communicate to the outside world. The present units utilize the open standard DNP3 communication protocol to communicate to the Hub Controller ("Hub") (2) although modern computer technology provides a wide variety of application protocols that could be used. Since the DES units are dispersed over a wide geographic area, a radio communication system (3) is preferentially utilized to facilitate the information exchange with the Hub (2). S&C Electric Company's SpeedNet™ radio system can be used for this purpose, as can a wide variety of other communication products using radio or any other suitable media.

The Hub (2) executes the energy dispatch and coordination functions that are the subject of this patent. In an embodiment, the Hub is provided as a pre-packaged, self-contained, rack mountable, PC-based server appliance, with internal software components organized using a service-oriented architecture (SOA). The software may be built around the Microsoft™ Corporation's Windows Server 2008 operating system, although any other suitable technology, multi-tasking PC operating system could be used. The Hub (2) is primarily self-contained in that it is able to operate and dispatch energy-related operating commands and data without external components other than the DES units (and the intervening wide area communication system), plus a local communication interface (4) to the substation's feeder and transformer breakers which have their own, internal capability to sense current, voltage and other power-related data at the respective breaker. These breakers are commonly available from a wide variety of sources and are typically outfitted with prepackaged breaker controls. The breaker controls include instrumentation and metering functions that allow feeder power/metering data (voltage, current and other derived power properties) to be accessed. The data is then made available to other substation applications such as the Hub, using DNP3. DNP3 can run over local communication media such as Ethernet or RS232 serial lines, both used widely in the substation environment. The data is provided to the Hub as pre-conditioned, averages over a few seconds of time to reduce the inaccuracy due to brief fluctuations. An example breaker control is the Schweitzer Engineering Laboratories (SEL) 351S. Although the Hub controller has been implemented with the above components, there are many possible ways to implement the system architecture, the goal being to bring information from the DES units, from other instrumentation such as substation feeder breakers, transformers, and from a system configuration database into an intelligent device that can allocate energy flows in and out of the DES units based on diverse potential needs and requirements.

Another interface to the outside world is an optional interface to the customer's SCADA system (5) to allow the distribution operators to monitor and manage the Hub system in a limited sense. The interface also provides the capability for the utility's distribution operators to select the Regional Demand Limit, which is one of the Hub's system settings. This value is accessible over DNP3 as an analog output to an external application. The utility could therefore provide the means for an external automation system such as the utility's Energy Management System or Distribution Management System to automatically set the value using DNP3 and the same communication interface used by the SCADA system (5).

A more fully-functioned interface, relative to the distribution operator's SCADA system is a local Human Machine Interface (HMI) (14) that can be directly accessed in the substation via a local keyboard and display interface/web browser (7) or remotely accessed using a variety of methods supported under the Windows Server operating environment. The local HMI provides full control over the operation of the system and provides an alternate means for the distribution operator to set the regional demand limit (External Three-Phase Demand Trigger).

Internal to the Hub are several additional/optional individual software components. The Device Application Server (DAS), (6), provides a DNP3 protocol-compatible interface to external devices including substation equipment (4) mentioned above and the DES units themselves via the wide area network communication system (3). The DAS (6) provides a service-oriented architecture for exchanging data and control functions between applications internal to the Hub and the DAS. It also provides translation between application-oriented, named data values and the numeric identification of DNP3 points. A convenience provided by the DAS is to act as one or more DNP3 "virtual" devices. This feature configures the DAS to act as a server to external DNP3 applications such as substation SCADA and DMS systems via (5). The DAS receives DNP3 poll requests and responds using its own cached data. Hub applications can populate the cache with the appropriate data. The DNP device description for these "virtual" devices is configured into the DAS and the API to the DAS allows the DAS to either respond to external requests for data from the data stored in its cache, or to transmit the request to the Hub application. Control commands from external applications are transmitted directly through the virtual device and the DAS to the Hub dispatch engine (see below). The DNP protocol implementation in the Hub Controller is described above for completion. A perfectly-suitable alternative design would incorporate the DNP protocol directly in the Hub application or could use an entirely different communication protocol to exchange data with other applications and devices or could use any possible combination thereof.

Another component of the Hub Controller, also mentioned for completion, is an Oracle Database and database server application. All system settings (8), real-time data (9) and historical results (10) is stored in the database which offers convenient and reliable non-volatile data storage and retrieval as well as advanced security features. The database can also be replicated to an external database server for backup. Another feature of the Oracle database is its ability to be loaded with a copy of the distribution operator's geospatial (15) and electrical connectivity (12) system data. This data is used by the Hub to determine exactly where the DES units are, relative to the feeders and other electrical components. Once again, the use of an Oracle database is a convenience and all of the data could be configured and accessed from alternative database structures, traditional files and/or all possible combinations of Oracle database, alternative database and traditional file storage.

The heart of the energy dispatch function provided by the Hub is the Hub Dispatch Engine (HDE), (13), which is a focus of the present disclosure. Utilizing most of the other interfaces and databases, the HDE provides coordination and control of both real and reactive power flow going into and out of the individual DES units.

Figure 1B:
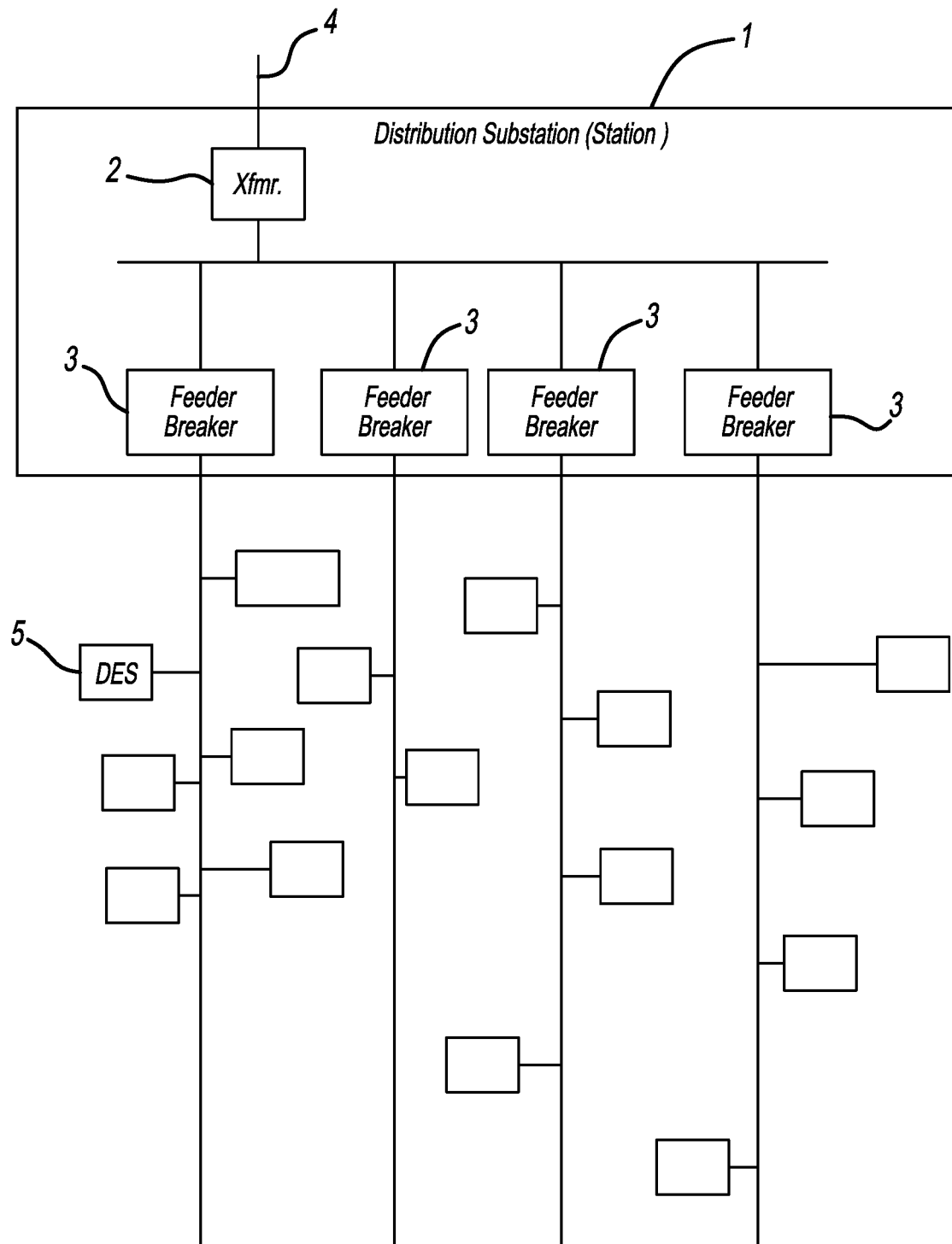
FIG. 1b is a graphic illustration of a distribution system with DES units.

FIG. 1b provides a rough sketch of a distribution system with DES units. Power to the distribution substation, or "station" (1), is fed by a transmission line (4) that enters the station and goes directly into the station transformer (2). At the entry to the transformer, current and voltage sensing elements (not depicted) provide inputs to a relay providing protection for the transformer as well as power flow metering elements used by the HDE's dispatch logic. This described embodiment illustrates a single transformer supplying all of the feeder circuit breakers (3) for simplicity, although alternatively it is possible to have multiple transformers supplying the feeders. The transformer (2) typically feeds multiple feeder circuits, each with its own circuit breaker (3). The number of feeders is arbitrary. It should be noted that the individual circuits are shown each as a single line, although power is actually supplied as three separate phases. Sensing is provided individually on each phase. DES units (5), identified for simplicity, are scattered throughout the distribution system, outside the station. Although not shown on the diagram, each DES unit is connected to a single phase of the feeder, on a secondary circuit, isolated from the feeder by a distribution customer transformer not shown. The DES units are distributed across multiple phases and multiple feeders. A potential implementation will see as many as a hundred or more DES units connected to the various phases on any one feeder. In the illustrated embodiment, the customer transformers are assumed to be connected phase-ground, although with minor transformations the system could easily work with phase-phase connected transformers. It should also be noted that a three-phase DES unit could be built, consistent with the principles disclosed herein. Such a unit would typically serve a three-phase load such as a commercial or industrial customer, and would have the added benefit of being capable of improved feeder balancing since power could be shifted back and forth between phases.

Terminology, Variables, and Conventions

See Table 1 (attached at the end of the this text) for a list of terms used in this disclosure.

Tables 2a-d (attached at the end of this text) list settings (or setpoints) used by the HDE (13). In one possible implementation all of these reside permanently in a non-volatile, centrally-sharable database, although other data structures may be employed. In the attached settings/database tables, the term "(list of)" indicates that the items below are part of a repeating group of data elements of a record type described by the following text. Each of these repeating groups or records is uniquely identified by a text string, referred to as "ID". Internally, there may be an additional numeric index value for efficient.

Table 2a lists HDE (13) global settings. The settings in this category are unique to the station and used throughout the disclosure. Table 2b lists the HDE's settings unique to each feeder leading out of the substation. Table 2c lists the HDE's settings unique to each DES Group in the Hub. Of note is that there are multiple algorithms that can be selected-from for charging, and multiple algorithms that can be selected-from for discharging each group. The data structures provide selections of schedules and additional parameters for the desired charge and discharge algorithms, and also selections and additional parameters for all of the alternative algorithms. By doing so, the user can change the selection of the desired algorithm, without losing the values of the associated parameters should he/she decide to change back to a previously-configured algorithm.

Schedules for the various charge and discharge algorithms have similar data, but must be kept carefully separated to avoid misuse. For example, if a fixed charge schedule was inadvertently assigned to a Group for fixed discharge scheduling, the Group might operate at a completely erroneous time period. Additional, subtle differences are also of concern. For example, a fixed discharge schedule will likely be used to discharge the Group at a certain, very limited time of the day, perhaps no more that 3-6 hours, while a demand-limited discharge schedule would attempt to span the entire possible period of high demand during the day—this could be 8-12 hours or more. So schedules that are presented to the user should come from a list consistent with the type of algorithm the customer has selected. To accomplish this separation, a separate table in the database is constructed to relate the Group to its schedule, and to the type of schedule (algorithm) used for discharge and the type of schedule (algorithm) used for charging.

Table 2d describes Unit-specific settings used by the FIDE. Some of the settings in this Table are configured in the Hub, and some are configured individually in the DES units. Any time a setting changes in the DES Unit, it will notify the Hub that it needs to refresh its copy of the Unit's settings. For clarity, the table indicates which settings are configured in the DES unit versus the Hub.

Tables 3a-d (attached at the end of this text) list programming variables that are referred to in this patent. Table 3a lists variables that are calculated and used system-wide. Table 3b lists variables that are unique to each feeder. That is, a unique set of variables are maintained for each feeder configured into the system. Table 3c lists variables unique to each DES group. Table 3d lists variables unique to each DES unit.

Power Sign Conventions

Figure 2:
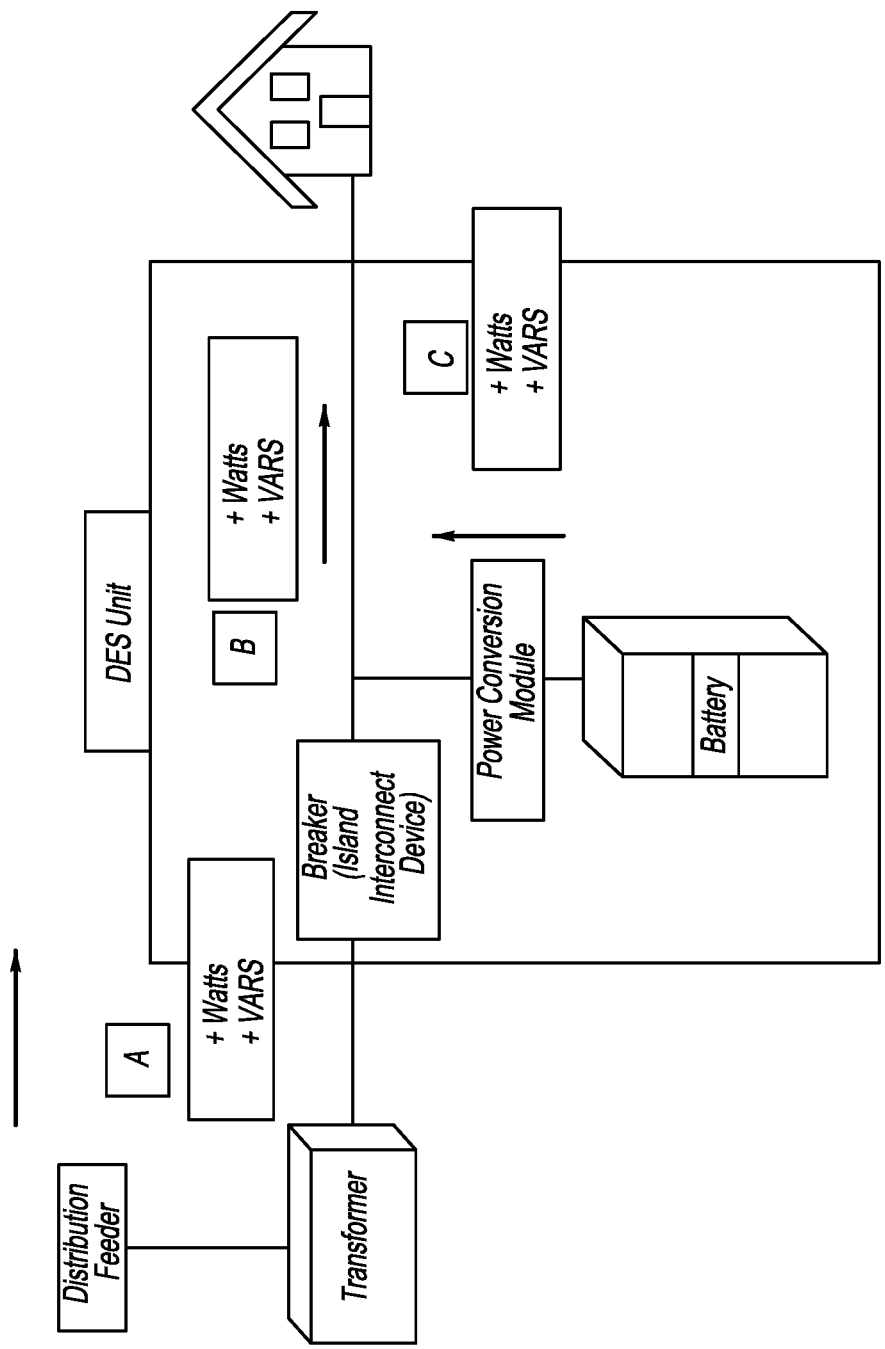
FIG. 2 is a graphic illustration of a DES unit and illustrating power flow.

An important convention in the disclosure relates to direction of real and reactive power flow. Referring to FIG. 2, DES units and the DES system as a whole can be looked upon as a distributed power source with the unique characteristic of being able to consume power (act as a load) or produce power (act as a source). The DES units can operate in any of four quadrants; producing or consuming real or reactive power. The following conventions have been adopted to reduce the ambiguity of settings and reported power quantities. These conventions are consistent with IEEE 1547 and IEC 61850.

The DES unit along with associated downstream loads constitutes a Local Electric Power System (LEPS) and as such can be viewed as a load connected to the Distribution System. The DES breaker is the "Island Interconnection Device (IID) as it is termed in IEEE 1547.4. The connection of the inverter leads to the DES termination bus is the "Point of Distributed Resource Connection." The inverter and battery in combination constitute a Distributed Resource and, as such, are considered a source. FIG. 2 illustrates the corresponding power flow conventions.

Some examples are elaborated below:
1) When the DES unit is in Standby Mode (neither charging or discharging Watts or VARS) and there is some customer consumption of both Watts and VARS, there is a net power flow into the DES unit expressed at Point A as positive Watts and positive VARS. The power flow at point B is also expressed as positive Watts and VARS. The power flow at point C is zero.
2) When the DES unit is discharging real and reactive power at levels exceeding local customer consumption of real and reactive power there is a net power flow out of the DES unit expressed at Point A as negative Watts and negative VARS. The power flow at point B is expressed as positive Watts and VARS. The power flow at point C is expressed as positive Watts and positive VARS.
3) When the DES unit is charging real power continuing to discharge reactive power at levels exceeding local customer consumption of real and reactive power there is a net real power flow into and a net reactive flow out of the DES unit expressed at Point A as positive Watts and negative VARS. The power flow at point B is expressed as positive Watts and VARS. The power flow at point C is expressed as negative Watts and positive VARS.
4) When the DES unit and its associated customers are islanded, there is no power flow into the DES unit and power flow expressed at Point A is zero. The power flows at points B and C are matched, presumably both positive Watts and positive VARS.

Tables 4a-d (attached at the end of this text) describe the data elements that are used for information exchange between each of the DES units and the Hub. As mentioned previously, the DNP3 communication protocol is used as a standardized vehicle for exchanging this information although a nearly unlimited number of different communication protocols could be used. Table 4a lists DNP analog input points that are read from each unit at the start of each execution of the control loop. Table 4b lists DNP analog output points that are selectively written-to when the control loop has recalculated energy settings or at any other appropriate time. Table 4c lists DNP digital status points also read from the unit at the start of each execution of the control loop. Many of these points are provided for information purposes but are not significant to the energy dispatch functions. For example, specific alarm points are provided to support detailed troubleshooting data. Table 4d lists DNP digital outputs that allow the Hub to control the operation of the DES units. These outputs are written selectively to control the basic functioning of the DES units.

In summary, the Hub provides its own DNP polling engine and internal cache via the APS. Timing of polling is determined by whether or not the destination device is a station device or a field device as discussed below. All communication parameters are configured in the system database. During normal operation, DNP standard objects are used to exchange status, analog and control information between the DES units and the APS.

HDE Dispatch Control Loop

Figure 3:
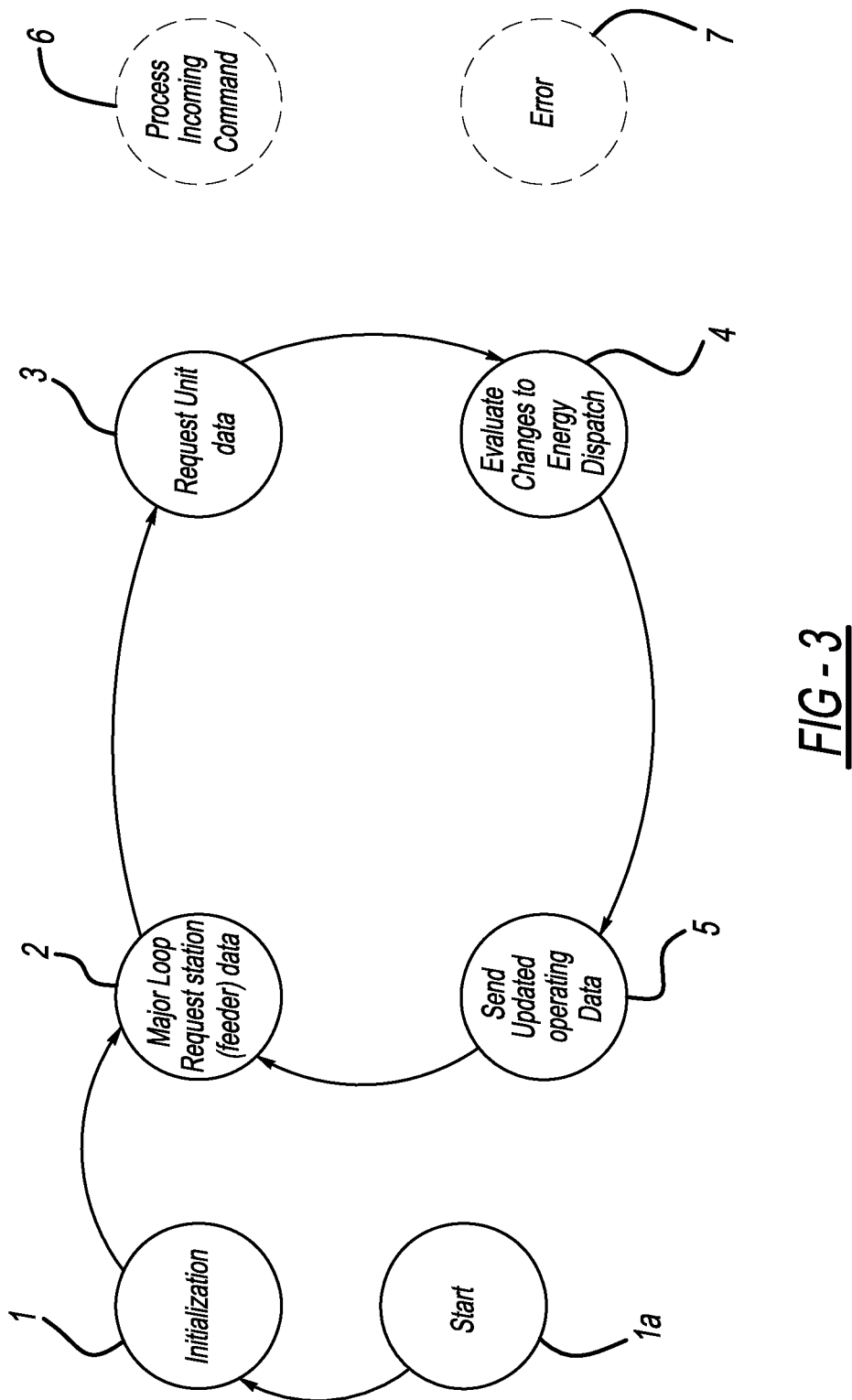
FIG. 3 is a graphic illustration of individual states and functions of each state of the control loop.

The Hub's energy dispatch function, executed by the HDE (13), is implemented in a fairly simple control loop. The individual states and functions of each state of the control loop are shown in FIG. 3 and described below:

Initialization (1, 1a)

The HDE accesses its master database and reads its configuration and last known operating state to determine, for example, if its dispatch functions are supposed to be enabled or disabled. See the next section for details on the initialization of the Hub's control sequence.

Request Station Data (2)

The HDE requests the APS, to perform a Class 0 DNP poll to determine current real and reactive power demand, voltage, and related data from the substation relays sensing power at the substation transformer breaker and at each feeder breaker. Table 5 (attached at the end of this text) lists the analog points read from the transformer and Table 6 (attached at the end of this text) lists the points from each of the feeder breakers.

Request Unit Data (3)

The HDE requests through the APS a similar sequence as used for Station Data, to request a Class 0 Poll of all DES units.

States 2 and 3 are executed as quickly as possible, sending requests in parallel to all devices without waiting for responses, subject to the specific communication requirements of each of the channels and devices. For example, substation equipment on serial lines must be polled one at a time, with responses processed for each poll request before the next device on that channel can be polled. However, for devices such as DES units that are deployed in an IP-based, wide area network, requests for all units can be sent as quickly as the requests can be accepted over the Ethernet interface, and responses are then processed as they arrive. Responses are cached by the APS for retrieval by the HDE. The APS provides timeouts and automatic retries to compensate for the possibility of lost poll requests or responses. The HDE then waits either for all responses to be received or for a predetermined time, gathers all expected responses from the APS and advances to the next state (4).

Evaluate Changes to Energy Dispatch (4)

On entry to this state, the HDE has received updated energy and performance data from all required sensing points. Responses from the APS that indicate that the cached data has not been refreshed are handled as off-normal conditions. These conditions prevent energy dispatch functions that require data from the affected poll response. For example, if the station transformer breaker cannot be read, the HDE ceases to attempt to satisfy capacity limitations associated with the transformer or regional/external capacity limits. If a feeder breaker cannot be read, the HDE ceases to attempt to satisfy feeder capacity limitations specifically associated with that feeder. If a DES unit cannot be read, it is treated as if it's completely out of service. If the overall communication status has deteriorated to the point where no DES units can be dispatched to meet any requirement, such as would be caused by a catastrophic failure of all communication associated with the HDS, then the Error state (7) is entered.

The logic in State 4 allocates both real and reactive power to/from the DES units. This allocation is discussed in detail in the next section.

Send Updated Operating Data (5)

The HDE transmits the updated real and reactive power requirements and operating information to each Unit, one-by-one, and then waits a predetermined time for a DNP confirmation. Analog and state data is sent as DNP analog and control outputs. Along with this data is sent the current time from the Hub for synchronization. Communication retry logic is handled by the APS and individual units that fail to respond after a predetermined number of retries are reported to the HDE as being out of service.

Processing Incoming Command (6)

The HDE responds to a variety of commands from the SCADA master station and a local HMI. These commands are processed immediately and perform a variety of management functions such as allowing the real and reactive power dispatch functions to be individually enabled and disabled, and allowing system settings to be changed. In the simplest implementation of the HDE, upon successful processing of any command the HDE is reinitialized.

Energy Dispatch Operating Mode

The HDE dispatches real and reactive power to DES units in aggregations called "Groups". See Table 1 for a definition of the Group construct adopted for convenience in the present implementation. Group aggregations allow the system operator to assign specific energy functions in a more systematic way. For example, an operator could assign all DES units near the end of the feeder to a specific group, and then schedule that group to discharge real power at a specific time of day known to cause low voltage or other power quality problems. It should be noted that in the herein described implementation, all operating DES units must be configured into at least one Group. Alternate implementations may not have this requirement.

Group configuration includes a combination of charge, discharge and reactive power compensation (RPC) parameters. In this system configuration all groups are configured to be consistent in terms of scheduled times of activity. Not all groups need to be scheduled to be charging at the same time, but some cannot be scheduled to charge while others are scheduled to discharge. For example, it would be a configuration error to have Group 3 scheduled for executing its charging algorithm while Group 4 was scheduled for discharging. However, since the sign of the charge or discharge rate could be negative, it is possible to use a unit to mitigate an emergency overvoltage situation by effectively charging the unit as part of its discharge cycle. RPC does not consume energy from the battery and can therefore be scheduled to operate during any time of the day or night, without regard to real power scheduling.

The system as a whole is in discharge mode when any Group is scheduled to be discharging, and is in charge mode when any Group is scheduled to be charging. This assumption simplifies the programming in the present implementation, although the principles can be applied equally-well in the more complex case.

Each Group has its own operating mode and schedule for charging and discharging real and reactive power configured into its settings database. These operating modes specify the actual charge or discharge energy allocation algorithm used by the DES units in the Group. The algorithms are listed below and further described in the next section.

Standby

If specified for the Group, or if the HDE's automatic operation mode is disabled (STANDBY mode), then all DES units in the Group are told to neither charge nor discharge, without regard to settings for the Group that the units are associated with. STANDBY affects both VAR and real power operating modes.

AUTOMATIC Operation (Real Power Discharge)

Figure 6:
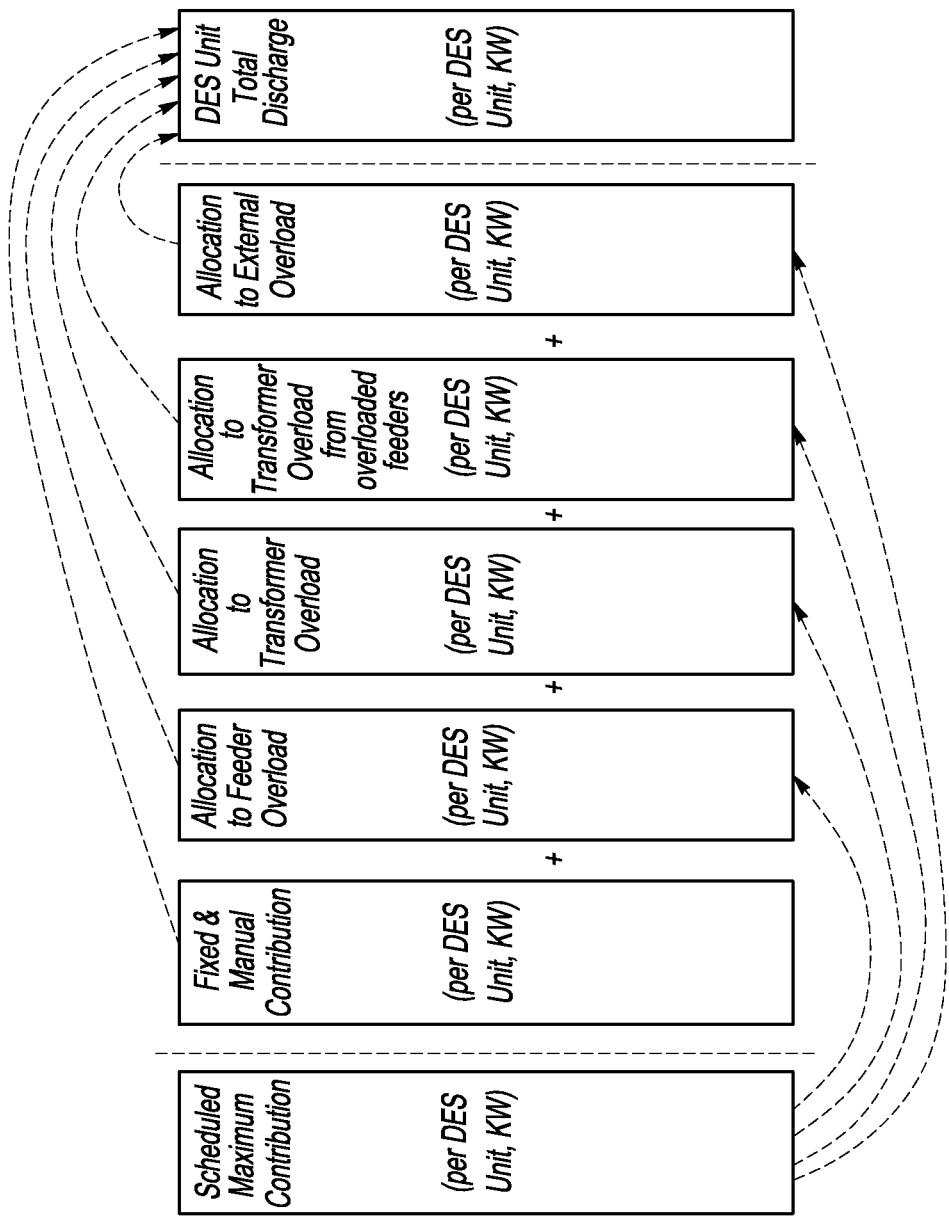
FIG. 6 illustrates a process for distribution of demand to the various DES units.

In AUTOMATIC operating mode, the HDE reads the definition of each of its Groups from the master database and then determines, for all units in the Group how the unit should be told to operate, as specified in the subsections below. FIG. 6 discussed below provides a graphic description of how the DES real power is automatically allocated to different needs.

Scheduled Fixed Discharge

This mode provides simplified operation of DES units based upon very predictable requirements for demand reduction. In this mode, each DES unit in the Group is commanded to discharge based upon a predetermined discharge schedule, unique to each day of the week.

Since the amount of energy stored in each unit is variable based upon various operating circumstances, at the time of discharge it is possible that there will not be enough charge stored in the group as a whole to meet the discharge requirements. As a result, two variations of discharge logic are supported. SCHEDULED FIXED DISCHARGE POWER PRIORITY allows the requested discharge rate to be unaffected but to be terminated early if the required energy is not available. SCHEDULED FIXED DISCHARGE DURATION PRIORITY allows the discharge rate to be reduced, proportionate to available energy in each unit, with the discharge time remaining unchanged. Variations of SCHEDULED FIXED DISCHARGE are shown graphically in FIGS. 4a-e.

The schedule configuration for each Group consists of the following information, repeated for each day of the week, Sunday-Saturday, plus an additional schedule entry for operation on holidays that occur during the week:

1) Fixed Discharge Start Time when discharge should begin (Hour, Minute)
2) Fixed Discharge Ramp Up Time (minutes).
3) Fixed Discharge Duration (minutes)
4) Fixed Discharge Ramp Down Time (minutes)
5) Fixed Discharge Rate summed over entire Group (KW)

Since the Fixed Discharge Rate is over the entire Group, the HDE must first determine what the Group is capable of (available discharge rate) at the time of evaluation:

1) For a unit that has a manual local override in effect, and which is discharging, it will be assumed to continue to discharge at the same rate that will be included in the calculation. The rate used is the rate read from the DES unit on the last poll.
2) For a unit that's offline or otherwise incapable of discharging, its contribution will be zero.
3) For any unit whose percent dispatchable capacity is zero, the unit's contribution will be zero.
4) For all other units, the unit's contribution will be
   a. Zero if not operating within a scheduled period.
   b. Proportionately between zero and its maximum rating if the evaluation time occurs during ramping.
   c. Its maximum rating for real power discharge, Maximum Rated Discharge in kW[1], if operating during a scheduled time period outside of the unit's ramping on or off.

[1] Maximum Rated Discharge in kW is the same as the nameplate rating in kVA, since reactive power output (at maximum real power discharge rate) is zero.

Figure 4A:
FIGS. 4a-e illustrate variations of scheduled fixed discharge of DES units in a DES system.
Figure 4B:
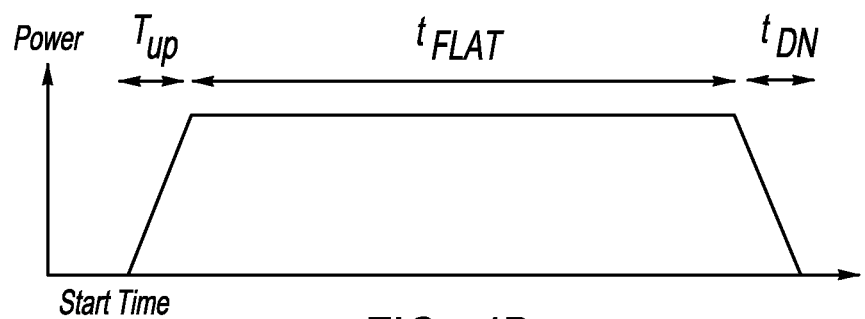
Figure 4C:
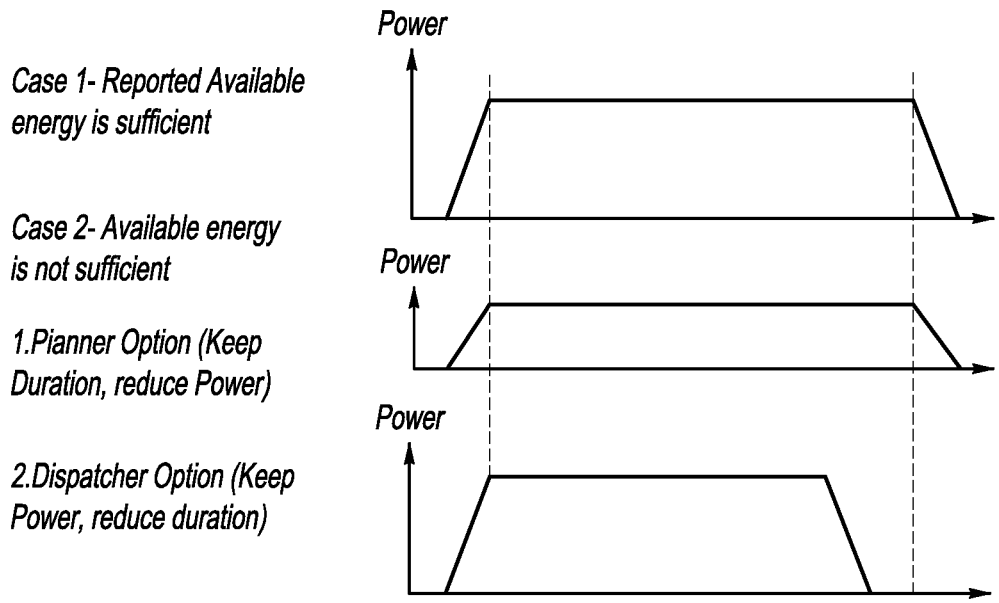
Figure 4D:
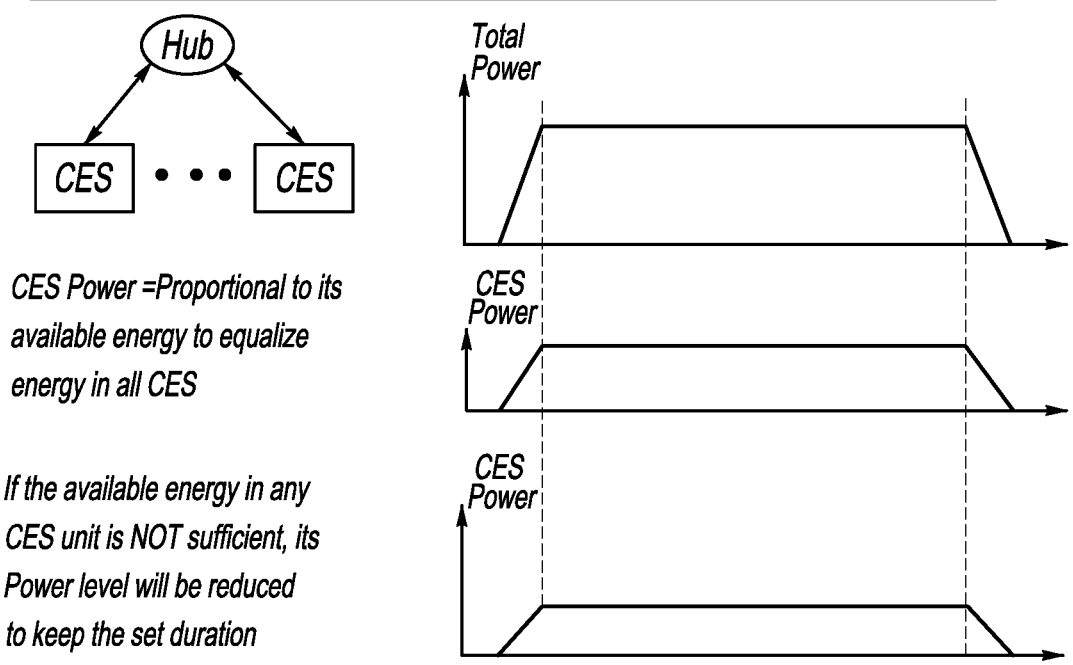
Figure 4E:
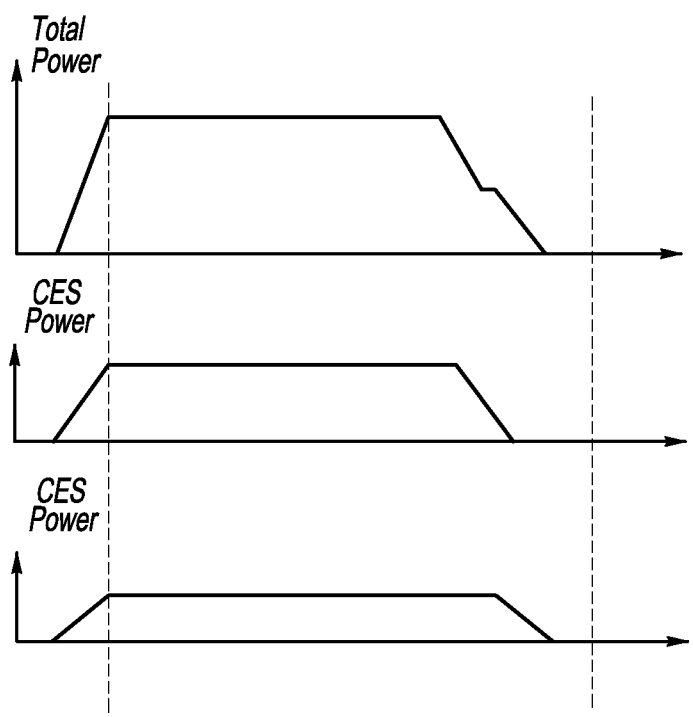

If the available discharge rate is less than the Group's configured Discharge Rate requirement:

a. (SCHEDULED FIXED DISCHARGE POWER PRIORITY) the discharge rates for each unit (fixed discharge rate) are unchanged, but the length of time is reduced without sacrificing ramp-down time (FIG. 4d).
b. (SCHEDULED FIXED DISCHARGE DURATION PRIORITY) the discharge rate assigned to the group is reduced to allow the discharge time to remain as configured (FIG. 4c).

If the available discharge rate is greater than the Group's Discharge Rate requirement as specified above, the fixed discharge rate, for each unit is reduced in proportion to the unit's scheduled maximum contribution. FIGS. 4a-e illustrate various possible scheduled discharge algorithms.

Scheduled Demand-Limited Discharge

This mode provides automatic control of demand to a maximum KW limit, within a scheduled period of the day. The limiting is prioritized, to three levels. The first level of limiting is to feeders as specified by the setpoint Feeder Three-Phase Demand Trigger (which is divided by three before use, and then used as feeder per-phase demand trigger), and if additional demand-carrying capacity is available, it is used to reduce demand at the station-level. At the station, a second, demand limitation is specified for the station's transformer (Transformer Three-Phase Demand Trigger Minimum) with an additional, third, externally-specified demand limitation due to transmission or generation restrictions (External Three-Phase Demand Trigger). The Station's external limit is typically controlled by the energy management system (EMS) and may be adjusted daily or as often as necessary. A manual setting is also supported to allow daily adjustment when EMS control is unavailable.

Peak shaving and load leveling may be planned and scheduled at the Feeder level to make use of the storage resources on one or more Feeders before the Transformer schedule requires additional discharge. Conversely, the Transformer schedule may require discharge before any of the associated Feeder schedules require discharge. This algorithm supports both scenarios.

This algorithm attempts to limit capacity utilization based upon a predetermined demand limit. The assumption in the basic algorithm is that the DES system as a whole contains enough energy to maintain the demand within the specified limit for the duration of the peak utilization. Further modifications on this algorithm are discussed in subsequent sections of this disclosure.

In the following discussion the term "overloaded" is used to indicate that there is a need for discharge to satisfy the settings of the applicable Transformer or Feeder.

Basic Demand Distribution Rules

The Transformer limit (Transformer Three-Phase Demand Trigger Minimum) is specified as a three-phase value but is applied per-phase by dividing the three phase value by three. The Station External limit (External Three-Phase Demand Trigger), however, is specified as a three-phase value and any DES unit on any phase is eligible to provide demand reduction against this limit. However, discharge is preferentially-applied to preserve or improve phase balancing at the feeder level.

The DES units each have the capability to automatically go into an "Islanded mode" where they disconnect the source of supply and carry the entire customer load from their internal energy storage system. When the storage is depleted, the system is shut down. The "islanding" state of the units is a status point (Running in Islanded Mode) that is read over communications and monitored by the HDE during processing of all poll responses. If a unit is in an Islanded operating mode, it is not called on to participate in any charging or discharging or reactive power dispatch functions, and its stored energy is not counted in the total energy available from the system.

Only DES units on an overloaded feeder phase can be used to reduce its demand as measured at the head of the feeder. Likewise, only DES units on the overloaded phase of a transformer can be used to reduce the overload at the transformer. Based on the way the algorithm works, the reduction of overload on a transformer is distributed proportionately and preferentially to DES units on the same phase of under-loaded feeders. Note that this could result in increased phase imbalance on those feeders. Only if the transformer overload cannot be supplied from under-loaded feeders will the overloaded feeders be tapped for demand reduction. Finally, all feeder and transformer overload conditions must be satisfied as best as possible before external demand reduction will be considered. This assures the best use of resources to satisfy all levels simultaneously.

The schedule information for each Group consists of the following information, repeated for each day of the week, Sunday-Saturday, plus an additional schedule entry for operation on holidays that occur during the week:
1) Demand Limiting Start Time Time during the day, after which discharge may begin if demand needs to be mitigated (Flour, Minute)
2) Demand Limiting Duration (minutes) The length of time during which demand limiting is in effect once the start time has been reached.

Note that there are no demand triggers for the DES units, for the Feeder, or the station Transformer specified for the Group. These parameters are independent of individual Group characteristics.

Since the demand limiting is over the entire Feeder, the HDE must first determine at the time of evaluation, what the demand is, per phase, at the head of the Feeder (e.g., Table 6: RealPowerPhaseA), and at the station transformer (e.g., Table 5: RealPowerPhaseA), and must correct for (add) to the feeder's demand, the energy contribution of all, presently discharging DES units (Table 4a: DES Storage Power) in all Groups on the load side of the affected phase at the sensing point. These corrected values are referred-to below as the corrected feeder per-phase demand and corrected transformer per-phase demand. The latter values are summed to yield the corrected external three-phase demand, which may also require demand limiting through dispatch (discharge) of DES units.

The HDE must also determine how much DES stored energy (translated to an available discharge rate in KW) is available to selectively dispatch. This requires summing the available (dispatchable) storage capacity per phase, per feeder, excluding units in a manual overridden or offline state, and excluding units on a fixed schedule. DES units on a manual discharge or fixed schedule are not further adjusted by the logic above to satisfy feeder, station, or external needs, however, their discharge is included as a contribution to demand limiting.

The DES unit provides some local control over the rate of power flow in and out of the unit. The control includes limiting the vector sum of real and reactive power to the unit's nameplate rating. It also includes limited control of power in relation to voltage support on the distribution line. That is, low or high voltage may limit or suppress charge or discharge of the unit, respectively. Since these are local conditions that can change rapidly in real time, the HDE does not attempt to take them into account. Therefore, the HDE's dispatch of energy is effectively a maximum discharge or charge rate that may be locally limited by the unit during operation.

Demand Distribution Algorithm

DES unit discharge is dispatched as a maximum possible demand reduction, per unit (Table 4b: RealPowerSetpoint) and is calculated using the algorithm described below and illustrated in FIG. 5. Beginning at (1) in the FIG. 5, the algorithm assigns the demand reduction to all of the units, one by one, based upon the total, prioritized requirements of the system, sending the assigned discharge rates to the units during the HDE's main control loop:

1) At (2) in the Figure, for a unit in a Group configured for Scheduled Fixed Discharge, the Unit's total contribution will be its calculated fixed discharge rate (3).
2) At (4) in the Figure, for a unit that has a manual override (invoked locally or remotely) in effect, and which is discharging, it will be assumed to continue to discharge at the same rate which will be included in the calculation (5) (as manual contribution).
3) At (6) in the Figure, for a unit that's offline or otherwise incapable of discharging, its contribution will be zero (7).
4) At (8) in the Figure, for a unit whose percent dispatchable capacity is zero, the unit's contribution will be zero (9).
5) At (10) in the Figure, for all other units in Groups selected for Scheduled Demand-Limiting Discharge, the unit's scheduled maximum contribution will be:
   a. Zero if not operating within a scheduled period for the Group that unit is in (11)
6) At (12) the DES unit's contribution will be zero (13) if:
   a. the corrected feeder per-phase demand is less than its triggering threshold (feeder per-phase demand trigger), and
   b. the corrected transformer per-phase demand is less than it triggering threshold (transformer per-phase demand trigger), and
   c. the total of the three corrected transformer per-phase demands is less than the External Three-Phase Demand Trigger
7) At (14) in the Figure, the DES unit's contribution is initialized to its Maximum Rated Discharge in kW, that is, its Nameplate rating for maximum real power output which is equal to its kVA rating when reactive power output is zero, if we're otherwise operating during a scheduled time period. Note that this is an initial value that may be reduced if not all of the discharge capacity is needed.
8) At (15) in the Figure, the calculations above (item (5)) are carried out for all DES units in all Groups with the results (each unit's scheduled maximum contribution) saved for further adjustments in subsequent calculations. The scheduled maximum contribution is also summed over all units, per phase, on each feeder (per-phase scheduled maximum contribution), and over all units on all phases in the station (station scheduled maximum contribution). Additionally, the manual contributions and fixed discharge rates are summed similarly (per-phase manual contribution, external manual contribution, per-phase fixed discharge rate, external fixed discharge rate) for inclusion in demand calculations. When initial values of the discharge rates have been calculated for all units as per the above sequence, at (16) the algorithm moves to the next phase of calculation.
9) Beginning at (17), the algorithm seeks to prioritize the allocation of demand to DES units based on the relative importance of individual capacity constraints, giving priority first to feeder capacity limitations, then to transformer capacity limitations, and finally to requests for external or regional needs to reduce demand. Note in the logic below that DES units being discharged to meet feeder constraints will not be used to further meet transformer constraints unless these cannot be met by units on the appropriate phase of other feeders. It would be possible to prioritize these requirements differently based upon the relative cost or other impacts of overcapacity situations.

Another point relates to the predetermined selection of the absolute value of demand that establishes the capacity of the feeder (feeder per-phase demand trigger), transformer (transformer per-phase demand trigger), or external capacity (External Three-Phase Demand Trigger) restraint. See the section titled "Other Capacity Management Features" for enhancements that can further improve overcapacity mitigation.

Figure 5:
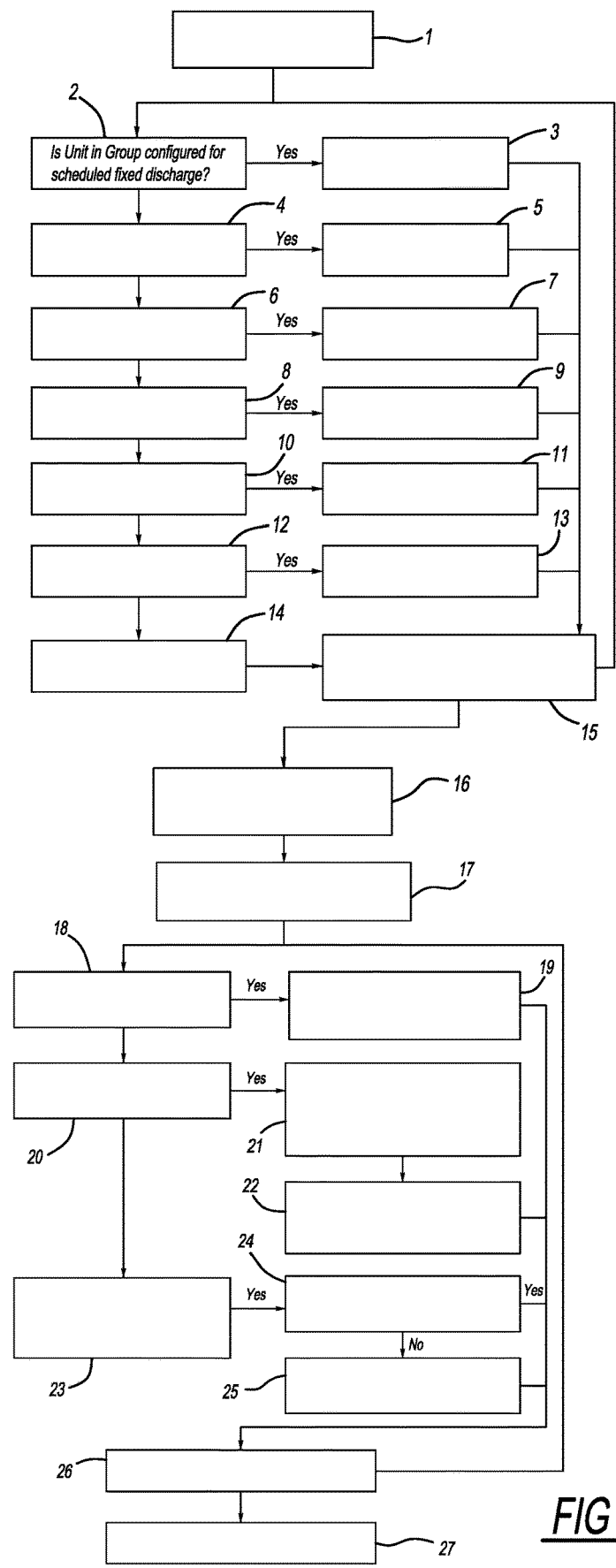
FIG. 5 illustrates a DES unit discharge process.

To determine the final discharge rate of all DES units, the following additional variables are calculated for each DES unit (each variable is zero if scheduled maximum contribution for the DES unit is zero):

a. (feeder is overloaded). Referring now to FIG. 5 at (18), if the corrected feeder per-phase demand is greater than feeder per-phase demand trigger, and the difference is greater than the sum of the fixed and manual contributions for all DES units on that phase (fixed discharge rate, manual contribution), then at (19) allocate as much demand as necessary to bring the load down to the capacity limit:

i. Divide the difference above, minus the sum of the fixed and manual contributions on the feeder phase, by the sum of the scheduled maximum contribution over all units on the feeder phase ii. Then subtract the proportion above of scheduled maximum contribution (yielding the variable: allocation to feeder overload) from scheduled maximum contribution for all units on that feeder phase.

iii. Note that the maximum proportion should obviously be limited to 100% (if this limit must be applied, a warning condition should be raised since the system is unable to adequately mitigate the overcapacity condition)

iv. (proportion based upon relative size and charge state of all units on the phase) For all units with a non-zero allocation to feeder overload, multiply the value by (itself times the unit's state of charge times the unit's capacity in kWH), divided by the sum of (itself times the unit's state of charge times the unit's capacity in kWH) for all units on that phase of the feeder with a non-zero allocation to feeder overload. This will proportion the discharge on the phase relative to both the capacity and the discharge state of all units being discharged[2].

[2] Note that this step in the logic allocates demand on a single phase of the feeder proportionate to a combination (multiple) of the Unit's nameplate size in kVA (Table 2d: Maximum Rated Discharge) and available energy in kWH (Table 4b: Available Energy). The same proportioning should be performed at every step that allocates demand to the feeder. In all cases, the balancing is over a single phase of a single feeder. The processing is mentioned only once in the text to reduce the volume of redundant specification.

b. (transformer is overloaded). At (20), if the corrected transformer per-phase demand is greater than transformer per-phase demand trigger, and the difference is greater than the sum of the fixed, manual and allocation to feeder overload contributions for all DES units (fixed discharge rate, manual contribution, allocation to feeder overload) on that phase throughout the station, at (21):
  i. Divide the difference above, minus the sum of the fixed and manual contributions on the phase, by the sum of the contributions over all units on the phase (excluding units on feeders with any phase overloaded from the sum).
  ii. Then subtract the proportion above, of scheduled maximum contribution (yielding the variable: allocation to transformer overload) from scheduled maximum contribution for all units on that phase, excluding units on feeders with any phase overloaded from the sum. Note that this proportion must be limited to 100%. If it is greater than 100%, the remaining demand overload should be remembered and may be reduced in the next step, and otherwise, the next step should be skipped.
  iii. At (22) divide the uncompensated demand overload above by the remaining scheduled maximum contribution summed over DES units on the same phase but on any OVERLOADED feeder.
  iv. Then subtract the proportion above, of scheduled maximum contribution, yielding the variable: allocation to transformer overload from overloaded feeders, from scheduled maximum contribution for all units on that phase. Note that this proportion must be limited to 100%. If it is greater than 100%, the remaining demand overload, summed over all DES units on the phase (unsatisfied transformer overload) should be remembered and reduced in the next step, and otherwise, the next two steps should be skipped.
  v. Divide the difference between unsatisfied transformer overload and scheduled maximum contribution, by the sum of scheduled maximum contribution for each remaining overloaded transformer phase.
  vi. Then subtract the proportion above, from scheduled maximum contribution for all units on that phase. Note that this proportion must be limited to 100%. If it is greater than 100%, the remaining demand overload should generate a warning since the system is unable to fully mitigate a transformer overload condition.
  Note that in the allocation sequence above, when mitigating transformer overload, the HDE prioritizes DES unit discharge first to feeders that, on a three-phase basis, are relatively lightly-loaded, then to feeders that have a phase that's overcapacity even if it's a different phase than the transformer phase that is overloaded, and finally, as a last-resort, to phases of a feeder that are overcapacity but have some remaining unallocated demand. This prioritization attempts to minimize excess heating of underground feeders from adjacent phases that are already over or near-capacity.

c. (externally-requested demand reduction). At (23) if the External Three-Phase Demand Trigger is non-zero, and the sum over all DES units on all phases of scheduled maximum contribution is non-zero, and at (24) the sum over all phases of corrected transformer per-phase demand minus the sum of all demand contributions from discharging DES units is greater than External Three-Phase Demand Trigger, then we have a remaining, unsatisfied need for additional demand reduction. Divide the difference by the sum over all DES units on all phases of the scheduled maximum contribution, and then:
  i. At (25) calculate the proportion above, of scheduled maximum contribution, yielding the variable: allocation to external station demand reduction, for all units on all phases. Note that this proportion must be limited to 100%. If it is greater than 100%, an event notification should be generated since the system is not capable of maintaining the desired external demand limit.
  Note that the algorithm for satisfying the external demand uses proportionately more energy from DES units that are otherwise under-allocated relative to their nameplate rating. It would be possible to allocate as much demand as was available, first from units on feeders that were not overcapacity on any phase and that were also not on phases that were overcapacity at the substation transformer.
  At (26) the discharge allocation algorithm is repeated for all DES units in the Fleet.

7) At (27) the final discharge rates for all units are determined and then sent to the DES units. For all units configured for Scheduled Demand-Limiting Discharge, and not in a fixed schedule or manual override operating mode, the final discharge rate sent to each DES unit in each Group is the sum of the individual contributions:
  a. allocation to feeder overload, which reduces demand on feeders from load-side DES units
  b. allocation to transformer overload, which reduces demand on the station transformer from DES units on the same phase but on feeders that are not overloaded
  c. allocation to transformer overload from overloaded feeders, which reduces demand on the station transformer from DES units on the same phase but on feeders that are overloaded
  d. allocation to external station demand reduction, which reduces demand when there is available, remaining DES capacity to reduce demand seen by an external source of supply, proportionate to DES unit remaining capacity.

The above distribution of demand to the various DES units is shown graphically in FIG. 6. The first column (variable scheduled maximum contribution) shows the entries for each DES unit that contain the amount of available power in each DES unit that can be used to reduce overload in the system via one of the Group allocations. It is initialized to the rated capacity of the unit, with some derating for the state of each individual unit. DES units that are either out of service, in a manual mode, or scheduled for a fixed amount of discharge are not included in the data. The second through sixth columns are individual components of discharge that get dispatched to reducing the respective overloads. As the logic proceeds, these columns are filled in, one by one, with each allocation causing a comparable reduction in the demand shown in the first column. After all six columns are filled in, the sum is stored in the seventh column. This last column if summed, will yield the total demand reduction in real time from the system, which would be seen at the station source.

The second column (Fixed & Manual Contribution, variables fixed discharge rate and manual contribution) is the amount of discharge that should be included in the total system output, but is otherwise not available to be dispatched to meet the various demand limits of the system. The third column (Allocation to Feeder Overload, variable allocation to feeder overload), is the amount of demand that is dispatched to reduce feeder overload conditions. The fourth column (Allocation to Transformer Overload, variable allocation to transformer overload) is the amount of demand allocated from DES units on un-overloaded feeders that is dispatched to reduce demand from the same phase of an overloaded station transformer. Note that the capacity from these units is used preferentially to reduce an transformer overload condition. The fifth column (Allocation to Transformer Overload from Overloaded Feeders, variable allocation to transformer overload from overloaded feeders) is the amount of demand allocated from DES units on overloaded feeders that is dispatched to reduce demand from the same phase of an overloaded station transformer. Note that the capacity from these units is used if there is insufficient capacity of the DES units on the more lightly-loaded feeders to eliminate a transformer overload condition. The sixth column (Allocation to Station Overload, variable allocation to station overload) is the amount of demand allocated proportionately from DES units with remaining capacity after all other requirements are satisfied, to reduce demand for constraints external to the station. Note that this demand is not phase-dependent—available capacity in DES units on any phase of any feeder can be used to reduce the external demand.

The last column is the sum of the individual contributions of the previous six columns. This value is written individually to each unit (Table 4b: RealPowerSetpoint) during the evaluation interval.

Other Capacity Management Features

Figure 10:
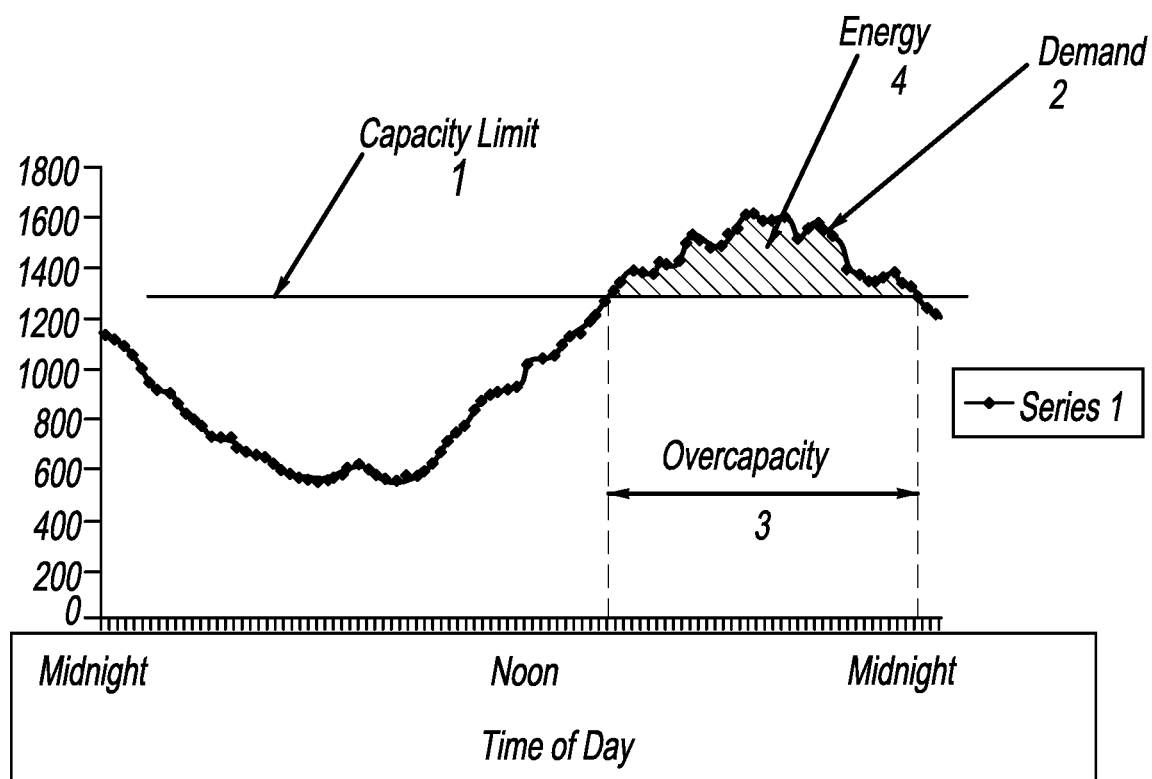
FIG. 10 illustrates a typical demand curve.

The logic of the previous section utilizes fixed demand thresholds to control the level at which the HDE should limit demand. Note that the amount of aggregated energy storage in the DES system is limited. It is possible that the integrated energy demand of the customers served by the system over the length of the peak operating period could exceed the available DES storage. If other measures were not taken to mitigate this possibility, demand could spike to undesirable or even damaging levels as the DES system runs out of stored energy. FIG. 10 shows a typical demand curve (2) that could be equally valid to demand on a single phase of a feeder, or on a transformer/station. In order to maintain demand at or below the fixed capacity limit (1), the HDE will dispatch discharge requests to the DES units on the affected phase for the entire period of time (3) that demand (2) is above the limit (1). The amount of energy in the DES units necessary to meet this requirement is the area under the curve (energy) shown as demand to be shaved (4).

Since the amount of DES energy storage is fixed, and since the amount of customer load can never be predicted to 100% accuracy, no system can provide perfect assurance that an overcapacity situation can be prevented. However, three generalized mechanisms are provided in this invention to further mitigate both the risk of overcapacity and its corresponding potential damage.

Emergency Reduction in Backup Reserve

In normal operation, the HDE attempts to perform all of its overcapacity mitigation/peak shaving without impacting the ability of the DES units to automatically "Island" with a pre-determined amount of backup power (see the Unit's DNP point: BackupReserve). This backup power allows electrical service customers to be supplied entirely from the DES storage system and remain unaffected by temporary interruptions in their source of supply. Commercially, the Islanding feature is something that the distribution operator may charge for, and therefore be committed to provide. At the same time, the commitment may have an exclusion for use in emergencies when failure to reduce load could cause damage to a portion of the distribution system or could cause the distribution system to collapse, in turn contributing to a regional blackout. On the other hand, when overcapacity mitigation, particularly to meet an external/regional requirement, is provided simply to reduce the cost of purchasing power on the costly "spot market", reductions in the backup reserve may be undesirable. For these reasons the HDE is designed to allow the backup reserve to be selectively and proportionately reduced. These decisions will more likely occur near the end of a discharge cycle, when the peak demand is declining, distribution cable and equipment is reaching its highest temperatures after extended peak use, and energy storage is at its minimum. The ability to tap into the system's backup reserve can reduce or eliminate corresponding overcapacity issues such as described below.

Each DES unit individually reserves its own, predetermined value for BackupReserve. The HDE's setting: Reserve Power Proportional Reduction can be used to globally and proportionately reduce this value if necessary to mitigate overcapacity issues at the external/regional level or at the station transformer. It would do so by sending an adjusted value (see the Unit's DNP point: BackupReserveScaleFactor) to the affected unit during the main control loop. Correspondingly, this value could be proportionately and selectively reduced on affected feeders to mitigate emergency overcapacity issues.

Referring once again to FIG. 5, operation (8), based upon the distribution operator's requirements, the following additional logic would be performed:

If the battery is not fully-depleted, that is, if the battery state of charge (see the Unit's DNP Point: BatteryStateofCharge) is greater than the Unit's DNP Point: DepletedChargeReserve, set the Unit's DNP point: BackupReserveScaleFactor to 0% and continue to (10) in the flowchart of FIG. 5.

The logic above would allow the backup reserve to be applied unselectively to all overcapacity constraints. Similar logic could be used to selectively apply the backup reserve only to overcapacity on the feeder the DES unit is connected-to, or to apply it only for a transformer overcapacity issue versus an external overcapacity issue.

Dynamic Modification of Fixed Overcapacity Trigger Thresholds

Mitigation of overcapacity conditions can be further improved by modification of fixed overcapacity thresholds in real time during system operation. For example, in the case of the external or regional capacity limit, this limit may be set, as mentioned above, to minimize the cost of purchasing or generating power during a peak operating period. In this case, the desired threshold is preferentially adjusted up or down to insure that the energy storage is fully-utilized, and that that utilization is distributed as uniformly as possible toward leveling instantaneous energy demand. Since the customer energy demand is variable, a precise trigger level cannot be predicted. However, sophisticated modeling tools allow an initial trigger level to be predicted, and then modified in real time using, for example, using the following inputs:

Measurements of historical energy demand as a function of time, for example, on 15 minute intervals.

Correlations with chronological properties such as time of day, day of the week, holiday status, month of the year.

Temperature, humidity and other environmental data from the surrounding area, measured on as frequent a basis as possible, preferably by hour.

Special local circumstances such as major sporting events or other entertainment, election days, etc.

In the above example, another problem that can arise is that the energy in the DES units may be called upon to meet feeder or transformer capacity constraints. In this case, the available energy may be less than required, but this might not be known until the peak period had been reached. The algorithm below provides the means to optimize the dispatch of energy to meet a regional or external requirement. A similar approach can be used to optimize dispatch to meet feeder or transformer capacity constraints.

Referring to FIG. 5 at item (23) and beyond in the flowchart, the term "External request to reduce demand", which actually refers to the predetermined value: External Three Phase Demand Trigger may be replaced with a value calculated using the procedure below:

1) At the scheduled start time of the discharge period, determine an initial value for the External Three Phase Demand Trigger which, based upon the aggregated total amount of storage available in the DES system, would exactly equal the predicted demand above the Trigger during the scheduled discharge time period, when integrated over time:

a. Determine the available storage in the DES system in kWH. To do this, sum the storage in all of the DES units in the Fleet (AvailableEnergy in Table 4b).

b. Predict the demand curve for the day. There are many possible ways to do this based upon a myriad of available modeling tools. However, for simplicity, the following approach is used in the present invention:

i. Establish the demand curve by averaging 5 minute sampling interval, three-phase total demand measurements for the same weekday day and time for the last four weeks, approximating the curve by joining the adjacent points with straight lines. Save this averaged demand curve for use in subsequent steps.

ii. Beginning with a proposed demand level trigger 1% below the peak value of the demand curve, calculate the energy, in kWH, required to reduce demand to that level. This corresponds to the integrated area between the curve and the demand level for the entire scheduled discharge period.

iii. Compare the calculated energy with the available storage calculated in 1a above. If the difference is greater than a predetermined level of accuracy, for example, 1%, continue to reduce/adjust the demand level until the two values are within the desired level of accuracy. This value becomes the initial value for the External Three Phase Demand Trigger.

2) Referring now to FIG. 3, State 4, once the scheduled start time has passed, update the External Three Phase Demand Trigger using a process similar to the process of steps 1a-b above, as follows:

a. Determine the remaining dispatchable energy stored in the DES system as was done in 1) a above.

b. Starting with the present time of day, adjust the saved demand curve from 1) b (i) by multiplying each of its points by the percentage difference of the demand read in FIG. 3, State 3, at the station transformer, for the most-recent demand summed over all three phases. For example, if the demand today at the present time is 110% of the average demand at this same time of day for the last four weeks, establish a new revised demand curve for today with each sample 110% of the average for the same time of day.

c. As was done in 1) b (ii) and (iii) above, but starting from the present time rather than the beginning of the day, calculate a new value for the External Three Phase Demand Trigger.

With minor modifications, the above procedure can also be applied to dynamically adjust both feeder and transformer overcapacity triggers. The only significant differences would be that the initial trigger would be a predetermined value established to protect equipment from damage, and the dynamic trigger would be raised if necessary but never lowered below the initial trigger value.

Capacity Management Based Upon Thermal Monitoring

The capacity management thresholds, Transformer Three Phase Demand Trigger Minimum, and Feeder Three Phase Demand Trigger Minimum provide a conventional means for the HDE to manage loading and mitigate overcapacity situations on the substation's transformer and feeders respectively. These settings are explicitly intended to limit damage to equipment from overheating which in turn is caused by excessive power flow for some period of time. However, there may not necessarily be a direct correlation between power flow and the internal temperature of electrical components. For example, a substation transformer with an internal temperature of 100 deg. C. will incur much more damage from a 20% overload than a transformer with a 60 deg. C. temperature. And the rate at which the heat can be dissipated is highly dependent on ambient air temperatures. For these and other reasons, the relationship between temperature and transformer loading (or overloading) is extremely complex. Therefore, the most precise way to monitor or actively manage transformer loading is to actually monitor temperature.

The means for measuring temperatures inside the most critical areas of substation transformers, particularly core windings (hot spots) and oil (often measured near the top of the tank and referred to as top oil temperature) are well known. Typical methods involve the use of fiber optic cables and sensors which can be connected to transducer elements that yield temperature measurements, usually in deg. C., which in turn can be monitored in real-time by the substation SCADA system.

Figure 12:
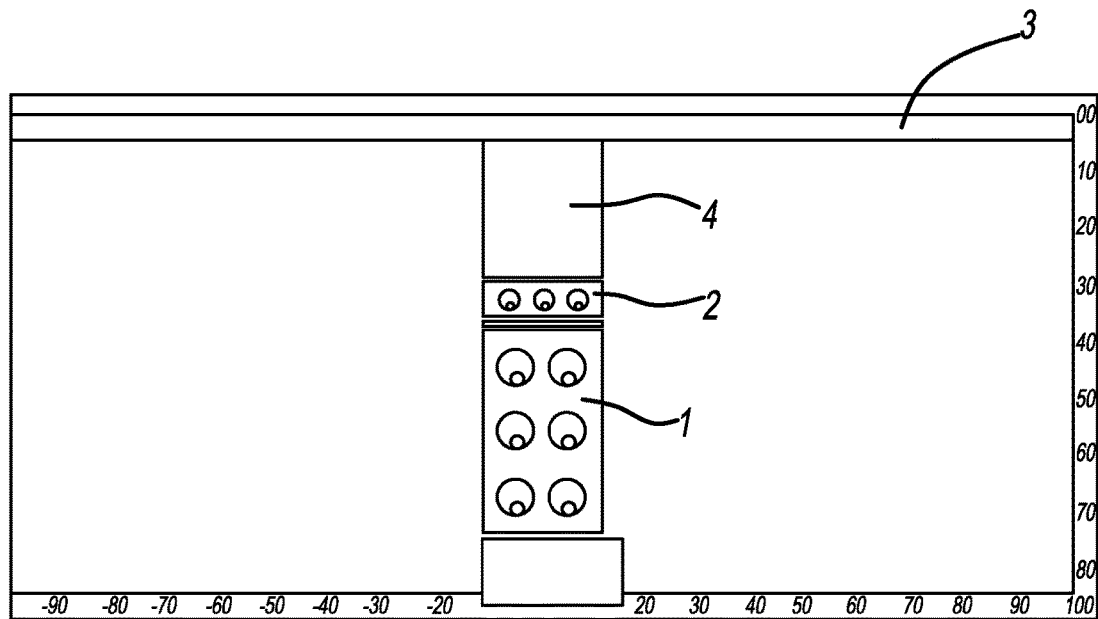
FIG. 12 illustrates an example of a pair of duct banks, one carrying two, three-phase circuits, and a second bank on top carrying a single circuit.

Even greater challenges to accurate capacity management are encountered on the feeders leaving the substation, and particularly on underground feeders. Typical underground cables are designed to withstand continuous temperatures of no greater than 90 degrees C. In urban or semi-urban areas, underground cables are generally carried in multi-feeder, concrete-lined duct banks, surrounded by soil and backfill of various types. FIG. 12 shows an example of a pair of duct banks, one (1) carrying two, three-phase circuits, and a second bank (2) on top carrying a single circuit. Over the top of this ductwork lies a paved road (3), shown as a black horizontal layer. When these cables carry currents approaching the circuit capacity, they generate heat, which must be somehow conducted to the earth or surrounding materials (4) and through the materials to the outside air. As with transformers, the correlation between power flow and the internal temperature of these cables is extremely complex. Factors affecting the heating, unrelated to power flow in the cable include effects due to heat generated by adjacent cables, variations in the thermal conductivity of the earth surrounding the duct, duct air circulation and temperature buildup from long periods of operation at peak or near-peak capacity. In the example figure, significant additional heating could be caused by sunlight on long stretches of black pavement. Because the underground cable is very costly to replace, sophisticated electrical and thermodynamic modeling programs such as the Cyme Corporation's CYMCAP™ program have been developed to calculate underground cable capacity. These programs help to reduce the uncertainty of estimating the true cable capacity. Unfortunately, thermal analysis in the underground system is greatly-complicated by the linear variations in both current flow and thermal conductivity that can exist over miles of underground infrastructure. For example, a section of duct that happens to run under pavement as shown in the Figure, where the pavement happens to receive lengthy periods of sunlight, could get significantly hotter than a segment that remains continuously in the shade.

As with substation thermal monitoring, the means for measuring underground cable temperature are well-known to those skilled in the art. A technology known as Distributed Temperature Sensing (DTS), using fiber-optic cable and highly specialized transducer boxes is capable of very accurately measuring temperature of the cable every few feet along its length.

Going beyond the challenges of transformer overload analysis based on temperature, feeder cable overload analysis requires additional provisions taking into account:

Feeder current at the location(s) of the limiting temperature(s). Since the feeder may have customer loads connected at various points along its length, current flow will vary accordingly.

Temperatures of adjacent cables, which may make it more difficult (or easier) to reduce temperature by reducing loading of the affected cable.

Differences in loading patterns of adjacent cables which can affect the rate of change of temperature in an overloaded section, making it more difficult to relate current temperature to the amount of load reduction necessary to stay within thermal constraints.

Fortunately, very sophisticated real-time analysis tools have been developed to reduce all of these considerations into a single, real-time output for each conductor providing its real-time (or dynamic) ampacity. An excellent example of this technology is the LIOS Technology Gmbh, RTTS real-time thermal rating system.

Thermal monitoring systems for transformers and underground cable such as the ones mentioned above have been available for some time. However, their use has been greatly limited by their very substantial cost, combined with the difficulties in quickly and effectively responding to thermal overload. Ideally, the response would be to reduce loading. However, the distribution operator has limited, and in many cases no available means to reduce customer load. A widespread deployment of DES units, combined with HDE management of capacity based on thermal monitoring provides a new, novel means to reduce premature aging and failure of distribution system components. The algorithms below provide the preferred means to implement this control, although many options exist for refinement based on these principles.

Transformer Capacity Management Based Upon Hot Spot Temperature Monitoring

Substation transformer overloads producing hot spot temperatures marginally above the continuous nameplate rating are known by those skilled in the art to cause very small, incremental amounts of wear or premature aging. Higher overloads cause exponentially greater wear. Based on the distribution operator's economic analysis of wear versus replacement cost, emergency or temporary overload is usually allowable based upon the amount of overload required and the length of time the overload will be required. The algorithm of the preferred embodiment allows the operator to configure the amount of overload to be tolerated in terms of hot spot temperature, as well as the length of time the overload may be present before load is reduced using DES real power dispatch. Multiple levels of overload can be specified, each with its own allowable duration. The algorithm measures hot spot temperature and load on the transformer during operation and uses the real-time correlation between the two to determine the amount of load reduction necessary to achieve the required hot spot temperature reduction. This eliminates the complexity of attempting to calculate the relationship based upon myriad other factors.

Figure 11:
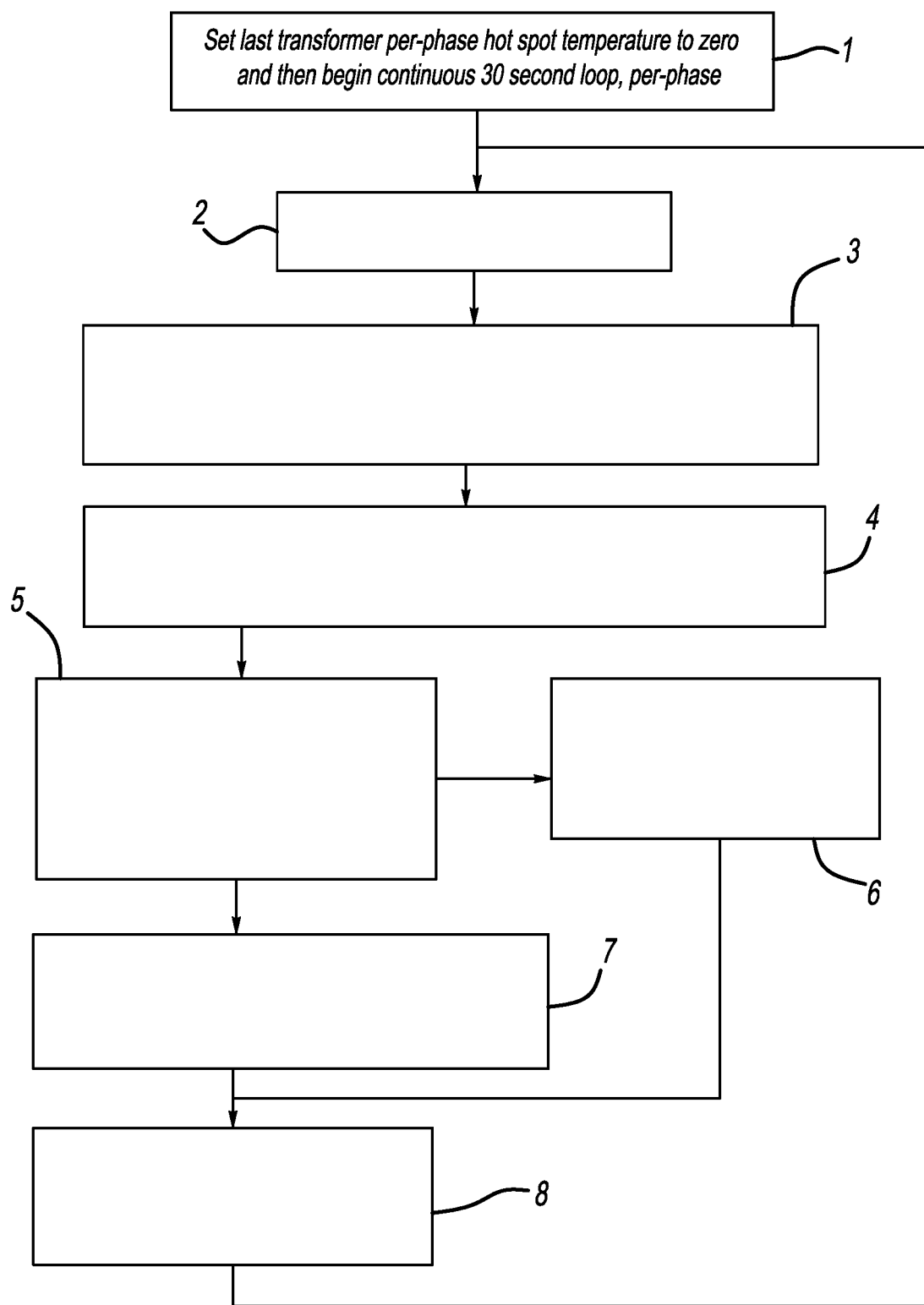
FIG. 11 illustrates a process of transformer thermal modeling dynamic demand adjustment.

Referring now to FIG. 11 and Table 7, the algorithm operates as follows. The settings applicable to the adjustment are shown in the first two columns of Table 7. These settings apply equally to each of the three phases of the transformer. However, the calculations of FIG. 11 are performed independently on each phase and result in a unique, dynamically calculated demand target (dynamic transformer per-phase demand threshold) for each phase. The table provides allowable levels of thermal overload (Transformer Hot Spot Temperature) with varying durations (Length of Allowable Overload) before load reduction is initiated via DES discharge. At (1), initialization of the dynamic adjustment of allowable transformer load begins. The initialization occurs at HDE startup and then the loop repeats forever, on a nominal 30 second basis which can easily be modified if desired. The variable last transformer per-phase hot spot temperature (see below) is initialized to zero and other variables are initialized appropriately. For example, dynamic transformer per-phase demand threshold is initialized to an infinite value for each of the three phases so the initial starting conditions defeat the possibility of discharging the DES units until it is determined that the transformer has been overloaded for a sufficient period of time. At (2), transformer per-phase hot spot temperature is read via SCADA communications and via the Hub's DAS from the transformer's breaker where the three, hot spot temperature monitoring points are read, one-by-one, as each of the three phases is processed in the 30 second loop. At (3) per-phase demand at threshold is saved if the logic detects that there has been a rise in transformer temperature across the associated temperature threshold in the table. Since these transformers are very large, their temperature changes relatively slowly, and by capturing the demand at the approximate moment that the temperature crosses the threshold, a demand approximating the load necessary to exceed that temperature can be approximated. At (4) if the demand is above any threshold, the amount of time that demand is continuously over the threshold is incremented. Excursions of temperature over the threshold are correspondingly filtered by this logic which is looking for lengthy periods of time when the temperature in the transformer is exceeding damaging levels. At (5) the logic is looking for the lowest table entry which has accumulated enough time to justify reducing demand. By looking for the lowest entry, the logic correspondingly retrieves an upper bound on the demand level that needs to be maintained (dynamic transformer per-phase demand threshold) to prevent the associated overload temperature from being exceeded. At (6) if the temperature is below the second-lowest entry, then the transformer is considered to be operating within its normal range and the dynamic transformer per-phase demand threshold can be set to an infinite value (or largest valid value) to prevent load reduction via HDE power discharge. At (7) the logic sets the dynamic threshold to a slightly lower setting than that corresponding to the upper bound above to keep the temperature just under the overload that has been exceeded. At (8) the logic saves the most-recent transformer hot spot temperature which is used in detecting the temperature transition at (3), and then continues around the loop to process the other of the three phases.

Referring now to the Section titled "Demand Distribution Algorithm", and the associated FIG. 5, the static transformer per-phase demand trigger used in Step (5) and Step (7b) (boxes (12) and (20) in FIG. 5) is replaced by the dynamic transformer per-phase demand trigger calculated in the present section.

Feeder Capacity Management Based On DTS

As mentioned above, real-time modules such as the LIOS RTTS system are capable of providing real-time ampacity data for individual conductors in the underground feeder system. This greatly simplifies the logic required in the HDE to manage feeder loading.

Referring now to the Section titled "Demand Distribution Algorithm", and the associated FIG. 5, the static feeder per-phase demand trigger used in Step (5) and Step (7a) (boxes (12) and (18) in FIG. 5) is replaced by a new value, unique to each phase, called dynamic feeder per-phase demand trigger which would be read using DNP from the above-mentioned DTS system.

AUTOMATIC Operation (Real Power Charge Mode)

In AUTOMATIC operating mode for charging energy storage, the HDE reads the definition of each of its Groups from the master database and then determines, for all units in the Group how the unit should be told to operate, as specified in the subsections below.

Note that a basic, distinguishing feature of Charge Mode is that if there is any feeder-level limit encountered on the amount of charging that can be accommodated at any point in real-time, then the charging-driven demand is distributed over all DES units attempting to charge, in inverse proportion to each Unit's state of available, dispatchable energy. This differs from discharge mode where the energy is proportioned only within the DES units of any given Group.

"Charge Mode" is entered when one or more Groups have schedules that call for charging at that point in time. It is assumed that none of the schedules for the fleet have overlap between charge and discharge schedules. Such an overlap would be considered a setup error. If its necessary to charge a unit during system-level discharge (or discharge during system-level charging), use Manual operation of the individual Unit(s).

Scheduled Fixed Charge Mode

This mode provides simplified operation of DES units based upon very predictable requirements for demand management. In this mode, each DES unit in the Group is commanded to charge based upon a predetermined charge schedule, unique to each day of the week. The schedule configuration for each Group consists of the following information, repeated for each day of the week, Sunday-Saturday, plus an additional schedule entry for operation on holidays that occur during the week:

1) Fixed Charge Start Time when charge should begin (Hour, Minute)
2) Fixed Charge Ramp Up Time (minutes).
3) Fixed Charge Duration (minutes)
4) Fixed Charge Ramp Down Time (minutes)
5) Fixed Charge Rate summed over entire Group (KW)

Since the Fixed Charge Rate is over the entire Group, the HDE must first determine what the Group is capable of drawing from the grid, worst-case (available charge rate) at the time of evaluation:

1) For a unit that has a manual local override in effect, and which is charging, it will be assumed to continue to charge at the same rate which will be included in the calculation. The rate used is the rate read from the DES unit on the last poll.
2) For a unit that's offline or otherwise incapable of charging, its contribution will be zero.
3) For a unit whose percent dispatchable capacity is equal to or greater than 100%, the unit's contribution will be zero.
4) For all other units, the unit's contribution will be
   d. Zero if we're not operating within a scheduled period.
   e. Proportionately between zero and its maximum rating if the evaluation time occurs during ramping.
   f. Its Maximum Rated Charge in KW, if we're operating during a scheduled time period outside of the Unit's ramping on or off.

If the available charge rate is less than the Group's configured Charge Rate requirement, the charge rates for each unit (fixed charge rate) are as specified above.

If the available charge rate is greater than the Group's Charge Rate requirement as specified above, the fixed charge rate, for each unit is reduced proportionately.

Scheduled Demand-Limited Charging Mode

This mode provides automatic control of demand to a maximum KW limit, during charging within a scheduled period of the day. The algorithm below distributes the charging demand, per phase, per feeder, proportionate to the energy discharge level of each Unit. That is, the least-charged DES units are charged up faster.

Handling of holidays is TBD. The schedule information for each Group consists of the following information, repeated for each day of the week, Sunday-Saturday, plus an additional schedule entry for operation on holidays that occur during the week:

1) Demand Limiting Charge Start Time Time during the day, after which charging may begin. (Hour, Minute)
2) Demand Limiting Charge Duration (minutes) The maximum length of time during which charging is in effect once the start time has been reached.

Note that there are no demand triggers for the DES units, for the feeder, or the station transformer specified for the Group. There is only one demand trigger (feeder per-phase charge trigger) and it is set at the feeder-level and applies to cumulative demand over all DES units on a given phase without regard to Group membership.

During the scheduled period, units will continue to charge whenever demand is under the feeder per-phase charge trigger. The allocation of charging demand must insure that the feeder per-phase charge trigger is never exceeded due to charging.

Since the demand limiting is over the entire feeder, the HDE must first determine at the time of evaluation, what the demand is, per phase, at the head of the feeder (eg Table 6: RealPowerPhaseA), and must correct for the effect of the demand from each charging DES unit (Table 4a: DES Storage Power) on the feeder's demand. This correction is the energy contribution of the charging demand in all, presently charging DES units in all Groups on the load side of the affected phase as sensed at the feeder breaker. These corrected values at the head of the feeder are referred-to below as the corrected feeder per-phase demand. Once the present charging demand has been subtracted, the HDE can reallocate charging demand to DES units based in part upon discharge state.

The HDE must estimate on each feeder phase, how much dispatchable charging demand can be accommodated, and in the worst-case, how much dispatchable demand would be drawn if it was available. The first value, per-phase dispatchable charging demand, is obtained by subtracting the corrected feeder per-phase demand from feeder per-phase charge trigger. The dispatchable charging demand is determined by subtracting any contributions to demand from any units on the respective feeder phase that are in a manual operation mode or configured for "Scheduled Fixed Charge".

Figure 7:
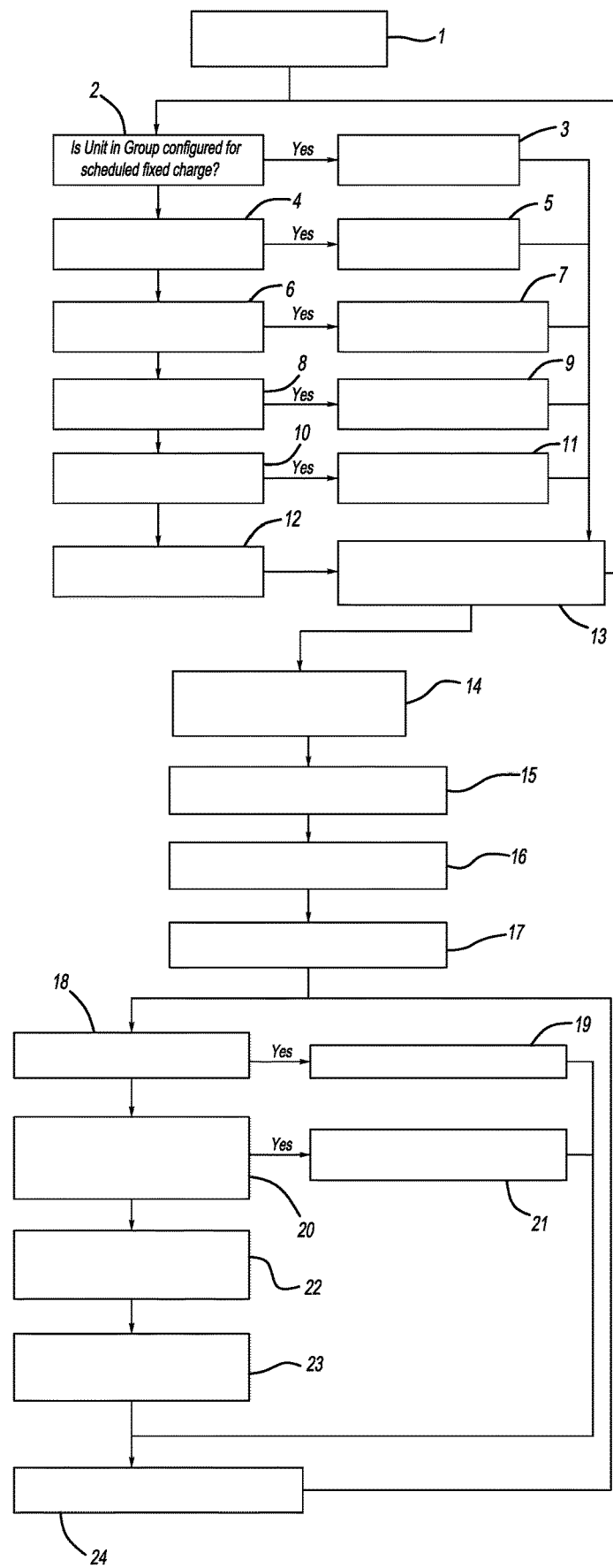
FIG. 7 illustrates a process to determine dispatchable demand, per-phase and per-Unit.

The dispatchable demand, per-phase and per-DES unit (Table 4b: RealPowerSetpoint) may be calculated as shown referring to FIG. 7 at (1), for each DES Unit, the dispatchable charging demand (CR) is calculated as follows:

1) In FIG. 7, at (2) for a unit in a Group configured for Scheduled Fixed Charge, the Unit's contribution to feeder demand (CR) will be set at (3) to its fixed charge rate.
2) At (4), for a unit that has a manual override (invoked locally or remotely) in effect, and which is charging, it will be assumed to continue to charge at the same rate which will be included in the calculation (as manual contribution at (5)).
3) At (6), for a unit that's offline or otherwise incapable of charging, its contribution will be set to zero at (7).
4) At (8), if the DES unit is in a group configured for Scheduled Demand-Limited Charging but the DES unit is fully-charged, the Unit's CR will be set to zero at 9.
5) At (12), for a unit in a group configured for Scheduled Demand-Limited Charging, whose percent dispatchable capacity is less than 100%, the unit's CR (at this step of evaluation) will be its nameplate rating discharge rate (Maximum Rated Discharge) at maximum real power output which is the same as its kVA nameplate rating. This demand value, each unit's scheduled maximum contribution, is then saved for further adjustments in subsequent calculations. The scheduled maximum contribution is also summed over all units, per phase, on each feeder (per-phase scheduled maximum contribution). Note that this value is demand going INTO the storage system, as opposed to output during peak shaving.
6) At (13) the calculations above are repeated for all DES units, aggregated over all groups scheduled for charging on each phase of each feeder, with the results saved for further analysis.
7) To determine the final charge rate of all DES units, the following additional calculations and variables are calculated beginning at (14):
   i. At (15), the corrected feeder per-phase demand (feeder per-phase demand corrected for the effects of units presently charging), is subtracted from the feeder per-phase charge trigger, yielding per-phase dispatchable charging demand.
   ii. At (16) the percentage discharge (100−percentage charged) of each unit with a dispatchable charging rate is summed up over all units under the HDE's control, yielding per-phase aggregated discharge level for use in further calculations.
   iii. At (17) each Unit's dispatchable charging demand is adjusted.
   iv. (feeder is heavily loaded). At (18) if the per-phase dispatchable charging demand is negative or zero the final charge rate for all dispatchable units on the feeder phase is set to zero at (19).
   v. (feeder is lightly loaded) At (20) if the per-phase dispatchable charging demand is greater than the per-phase scheduled maximum contribution, the final charge rate for all dispatchable units on the feeder phase is set to their scheduled maximum contribution at (21).
   vi. (feeder is moderately loaded) If neither of the above conditions are true, then the charging demand exceeds the available charging power. The charging demand per-phase, per feeder, is reduced in each unit, first in proportion to their relative maximum demand (Maximum Rated Discharge), then inversely proportional to their state of charge in percent (percent dispatchable capacity). The logic below is applied for each DES unit with a dispatchable charging rate:
      1. (charging proportionate to feeder capacity) At (22), for each unit the scheduled maximum contribution is multiplied by per-phase dispatchable charging demand and divided by the per-phase scheduled maximum contribution.
      2. At (23) the results of the step above are multiplied by the unit's percentage discharge (100−percent dispatchable capacity) and divided by per-phase aggregated discharge level to yield the final charge rate in kW.
      3. At (24) the logic repeats the sequence of calculations for all DES units on all feeders.

AUTOMATIC Operation (Reactive Power Compensation Mode)

DES units are capable of performing reactive power compensation (RPC) with minimal losses. For this reason, reactive power compensation, when enabled, is scheduled, typically, around-the-clock. However, to provide more flexibility for customers wishing to reduce DES run time, a single, master operating schedule is automatically associated with RPC. That is, a single schedule applies to all units dispatched by the HDE. RPC can be enabled or disabled independently of the other, real power-related automatic operating modes.

Interaction of DES RPC with Other Systems

In rough terms, DES reactive power compensation, per feeder, will typically provide no more than about one third of the reactive power required to achieve unity power factor, and even less when DES is actively peak shaving real power. However, DES RPC provides the equivalent of a "fine tuning knob" on other RPC control systems and should be dispatched accordingly. These other control systems generally include fixed and switched capacitor banks on the feeder, plus other fixed and switched substation capacitor banks. Where capacitor banks are present on the feeder, unless the feeder is operating near its voltage extremes, the operation of the capacitor bank will generally not be influenced significantly by DES.

Reactive Power Dispatch Fundamentals

The following general comments apply to the treatment of RPC by the HDE and DES units:
1. DES units produce power in any of the four quadrants. During the HDE's communication and control loop, it always sets both real (Table 4b: DES Storage Power) and reactive power (Table 4b: DES Storage Vars) setpoints when sending its power dispatch requests to the DES units. RPC dispatch calculations are performed after all real power charge/discharge dispatch requirements are determined, during the HDE's main communication and control loop.
2. DES units operating in manual control mode will generate reactive power output at their specified output level, with real power output taking precedence over reactive power (in order to stay within the Unit's rated voltage and power constraints—see below).
3. DES units respond locally to overvoltage or undervoltage conditions. That is, if a serious over or undervoltage condition develops, the Unit's internal logic will automatically force the unit into an islanded configuration to protect customer loads. The preferred embodiment of the HDE does not attempt to modulate VAR output to manage over or under-voltage conditions.
4. If RPC is not enabled or not scheduled to be active, and the unit is not in Manual operating mode, the HDE commands the DES unit to charge and discharge at unity power factor. The following additional rules apply only when RPC is enabled and scheduled to be active.
5. The HDE will establish the ability of each DES unit to provide RPC (maximum VAR output) according to the following formula:

$$\text{reactive power maximum output} = \sqrt{((\text{unit KVA Rating})^2 - (\text{unit real power output})^2)}$$

The DES unit KVA Rating is a nameplate rating fixed at manufacturing time and configured into the HDE's unit-specific database (Table 2d: Maximum Rated Discharge). Typical values are 25, 50 and 75 KVA. The "unit real power output" is the actual real power output being dispatched to the Unit. The net effect of the formula above is to prioritize real power output preferentially over reactive power output in all dispatch calculations, and to limit reactive power to the nameplate rating of the Unit. Note that the reactive power maximum output from the formula would be a positive number. Since the unit is capable of producing both reactive and capacitive power (or actually, power in any of the four possible quadrants), the actual maximum reactive power output can be positive or negative but will have the same magnitude in both cases.
6. As with real power dispatch, when dispatching the aggregated output of multiple DES units, if the total RPC required is less than the aggregated maximum output, the required reactive power output will be proportioned to the DES units relative to their maximum output.
7. The HDE maintains tables of information for the entire fleet, per unit, containing the following data:
   a. Most-recent real power (KW) output.
   b. Most-recent reactive power (VAR) output.
   c. Unit's available reactive power maximum output (using formula above).
8. Reactive power compensation, if enabled and scheduled to be active, is dispatched first to satisfy an external demand setting, and second, to produce unity power factor on each phase of each feeder.
9. An external RPC setting is provided as a three-phase unsigned value, summed over all phases, representing the amount of RPC to be applied, in units of KVARs. However, all compensation is applied independently, per phase. That is, unlike real power dispatch to satisfy external demand, excess reactive power compensation on one phase, cannot mitigate a shortage of reactive power compensation on another. That is, the external RPC setting is divided by three and the result applied individually to each phase.
10. Unlike real power discharge, external demand for RPC is specified relative to the most-recent, reactive power demand of the distribution system that would be seen if there was no DES system. This creates some additional complexity since the most-recent measured or predetermined RPC output of the distribution system already includes DES RPC for feeder-level as well as external RPC requests.

The above fundamentals are assumed in the RPC dispatch algorithm described in the algorithm below.

Reactive Power Dispatch Algorithm

Figure 8:
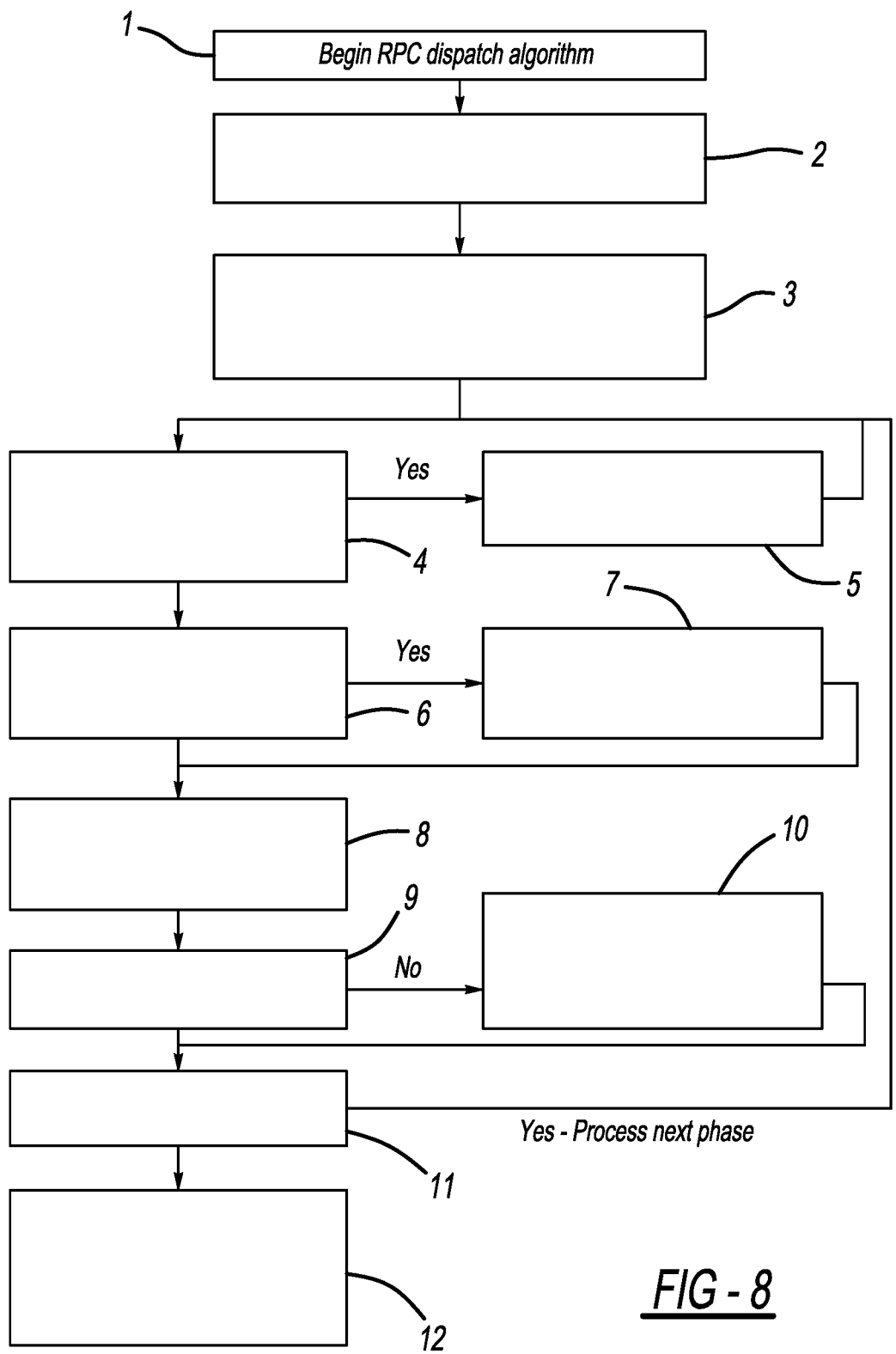
FIG. 8 illustrates a process to determine reactive power dispatch.

In the algorithm below, the term "inductive" refers to a flow of uncompensated reactive power such as that produced by electric motors, while the term "capacitive" refers to compensated reactive power such as that produced by shunt capacitors. The term "unity power factor" refers to the situation in which there is no reactive power present, either inductive or capacitive. Referring to FIG. 8, the algorithm begins at (1):
1. At (2), the HDE calculates the maximum VAR (RPC) output of each DES unit based on the most recent real power charge/discharge requests as calculated by the real power dispatch algorithms. It also retrieves the present RPC being applied from the last dispatch cycle, per phase.
2. At (3), the HDE calculates the maximum cumulative available RPC output for each phase, per feeder. It also calculates the total per phase over all phases for the entire DES Fleet. The calculations include contributions from all configured, dispatchable units.
3. At (4) if the total available RPC over the Fleet is less than the external RPC request, when viewed per phase, then at (5) all DES units on the affected phases, are dispatched at their maximum output.
4. Otherwise, at (6), for any phase that is not dispatched at its maximum output as above, the HDE examines the power factor on each feeder for that phase, selecting feeder phases that have an inductive power factor. In (7) it allocates the amount of RPC it would take, per phase, to provide unity power factor on each feeder on that phase, first subtracting the present output of the DES units from the most-recent readings at the feeder breakers. DES units on any feeder phase that is already capacitive are not allocated any RPC at this step. On any given feeder, if the available RPC from the DES units is not enough to provide unity power factor, the Unit's maximum RPC output is dispatched. Alternatively, if the required allocation is less than the maximum available RPC, each unit's allocation is reduced proportionately.
5. At (8) the logic for RPC in (6) and (7) is repeated for all feeders on the same phase that have inductive power factor. This attempts to serve the external RPC request preferentially by adjusting the power factor on all affected feeders and phases to unity power factor without over compensating (producing a capacitive power factor) on any of them.
6. Alternatively, if the RPC requirement cannot be fully satisfied from the above logic, at (9), the algorithm checks to see if there remains a partially unsatisfied RPC request. Then at (10) if the total allocation above over all feeders on the affected phase is less than the external RPC request, per phase, the difference is distributed proportionately to the RPC available from DES units on feeder phases already dispatched to unity power factor. This allows the power factor on any given phase of a feeder to become capacitive to serve an external, otherwise unsatisfied requirement for RPC.

7. At (11) the logic is repeated for each of the other two phases in the station.
8. At (12), only if there is no external RPC request, the HDE dispatches the DES units, per phase, per feeder, to achieve unity power factor at each phase of each substation feeder breaker. Contrary to external RPC requests, DES units can be dispatched to either generate or compensate for reactive power. On any feeder phase, if DES capacity to provide RPC is greater than demand, the output of all units is reduced proportionate to their reactive power maximum output.

Reactive Power Dispatch Examples

The following examples illustrate graphically the way the algorithm of the previous Section is applied. In the graphics, the shaded areas show reactive power on the given feeder phase. Green shaded areas show a feeder phase with an over-compensated, net negative (or capacitive) power factor, and a gold shaded areas show a feeder phase with an under-compensated, net positive (or inductive) power factor.

Figure 9A:
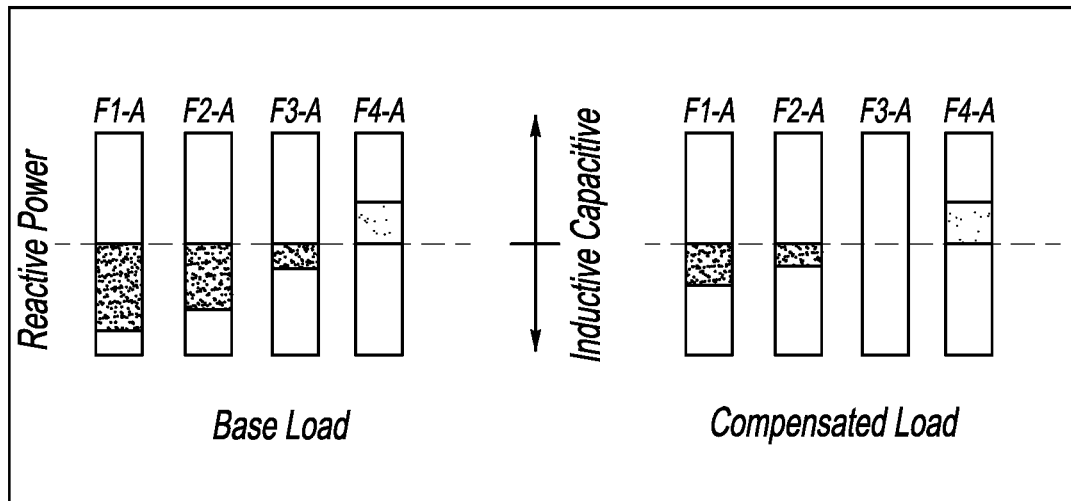
FIG. 9a illustrates a process for base loading of a phase on four feeders.

Referring to FIG. 9a, in this first example on the left side of the graphic, the base loading of phase A on four feeders, before application of DES RPC is shown. Feeder number 1 has the most uncompensated inductive loads, while feeder 4 has overcompensated load, presumably caused by over-application of switched capacitor banks on the feeder. The example shows the allocation of reactive power to meet an external request, when the external request is for slightly more compensation than that necessary to produce unity power factor on Feeder 3, phase A. Feeder 3 is brought to neutral power factor, and feeders 1 and 2 are reduced proportionately to their respective available RPC. Feeder 4 is unaffected since its reactive power was already over-compensated.

Figure 9B:
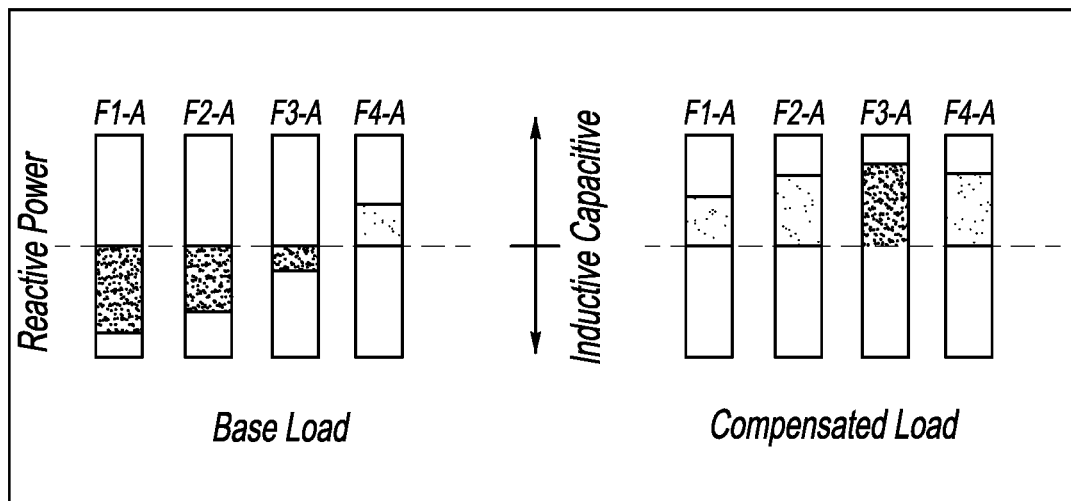
FIG. 9b illustrates a process to allocate reactive power to meet an external request.

Referring to FIG. 9b, this second example shows the allocation of reactive power to meet an external request, when the external request is for more compensation than would be needed to bring the specified phase (Phase A in the example) on all of the under-compensated feeders (F1-F3) to unity power factor. The additional required compensation is allocated proportionately, relative to remaining RPC capacity, among all DES units on the same phase on all feeders.

Distributed Temperature Sensing Control

Using DES in conjunction with distributed temperature sensing it is possible to control feeder loading. DTS includes an add-on module, hardware, software or combinations thereof that calculates real-time feeder maximum loading in amps. It is possible to use a relatively simple algorithm that substitutes DTS-based real-time feeder capacity value, per-phase, for the DES's feeder capacity setting. It also allows for distribution of the DES discharge as described above.

It is also possible to predict feeder loading using virtually any load prediction algorithm and if over capacity of the feeder is anticipated for some time period, day, hour, etc., to optionally reserve all DES capacity to reduce feeder conductor loading when needed. This also allows for the release of the reserved capacity when the loading peak has been reached.

From the DTS data, it is possible to extrapolate thermal rise and feed this predicted expected maximum cable temperature parameter into the DTS model and to control DES discharge to limit to the worst-case thermal capacity calculated.

Auto sectionalizing, auto reconfiguration technology, such as the IntelliTEAM distribution automation system allows for management of cable loading based on shifting normally open point. Using auto reconfiguration technology, it is possible to move the normally open point to reduce load based upon DTS-calculated capacity or to alleviate cable loading based upon DTS data or predicted cable maximum temperature. In similar manner, it is possible to rotate the normally-open point to distribute thermal overload to other cables.

Fault Direction Determination

Figure 13:
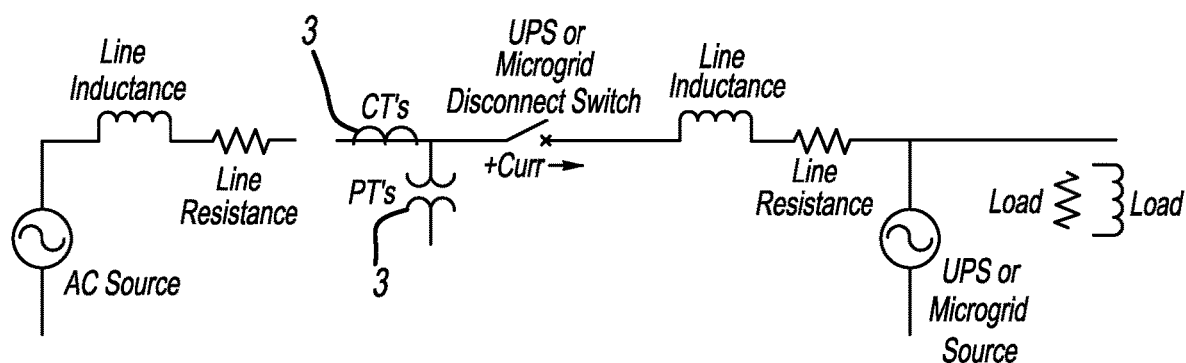
FIG. 13 is a one line diagram of a microgrid or offline UPS system.

In an offline DES unit, uninterrupted power supply (UPS) or a disconnect switch for a microgrid, measurement of voltage sags are a primary method of determining when the utility has a disturbance. FIG. 13 shows a one line diagram of a microgrid or offline DES unit or UPS system. A method for determining utility disturbances that is very rapid and robust is to do a sliding ½ cycle RMS voltage measurement. This works well for voltage sags caused by electrical faults in the utility. However, if the voltage sag is caused by an electrical fault in the load, the ideal solution is to continue to supply the load with the utility. This is because the DES unit, UPS or microgrid will have a larger voltage sag when supplying fault current than the utility. On the other hand, faults in the utility are best isolated from the microgrid, UPS or DES unit load allowing the DES unit supply, UPS or microgrid generation to carry the load. The determination of where the fault is in relation to the disconnect switch allows for ideal decision making. Additionally, this determination must be made very quickly (sub cycle) so the sagged voltage is quickly removed from the load when the fault is not in the load.

Using current magnitude through the disconnect switch will often work, but it has the problem that if there is generation or motor loads in the load when the fault occurs, high magnitude currents will flow from the load to the utility. In the case where the load is back feeding a fault in the utility, current magnitude alone can lead to an incorrect decision. More reliably, a change in power and VARs including the direction is observed to determine if the fault is in the utility or in the load. In addition, this is done at the same time the voltage is sagging so hence at the same time the decision is made to disconnect due to a voltage disturbance, the location of the fault can be determined. The magnitude and direction of the current can be determined in 1 to 10 ms.

Figure 14:
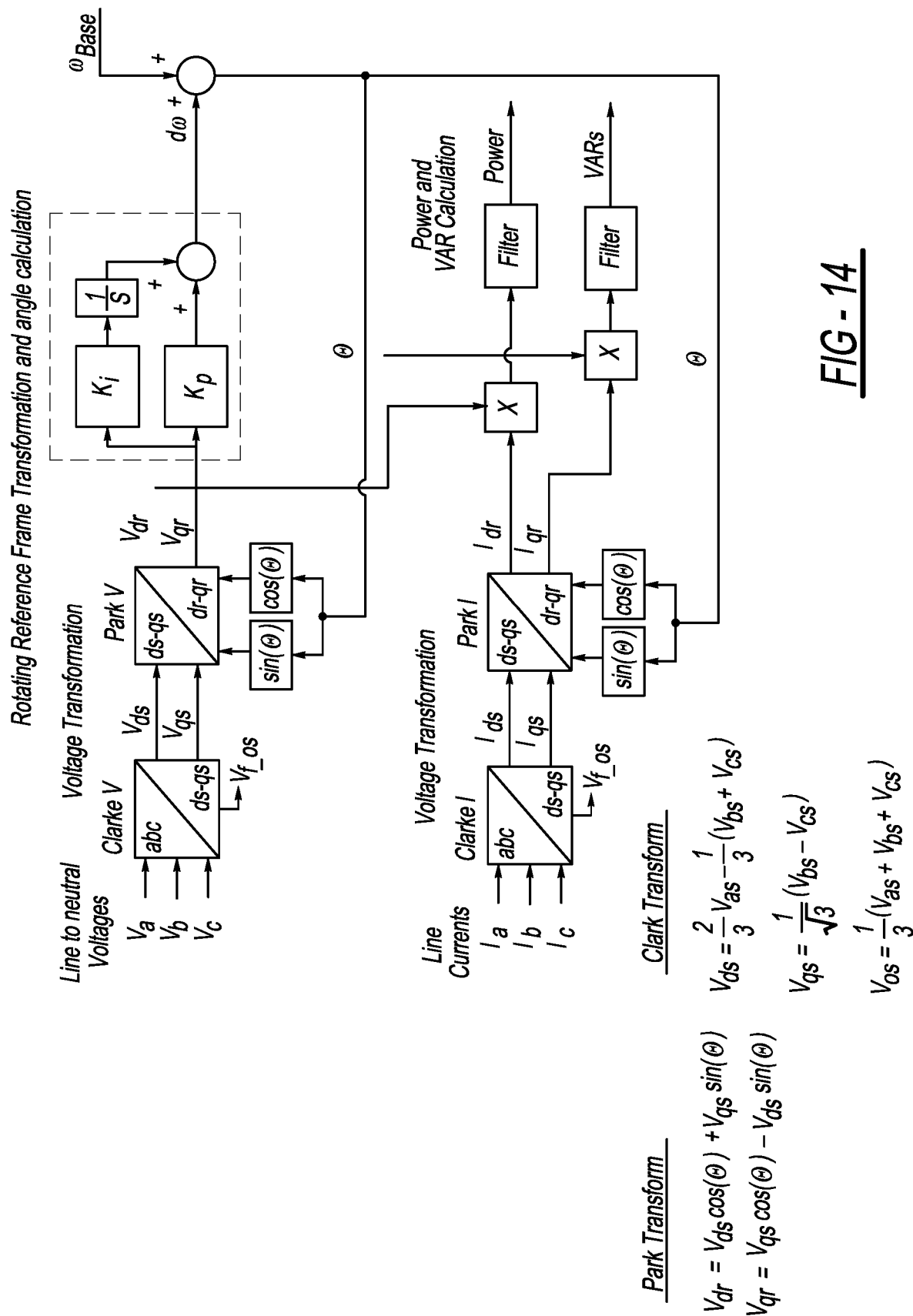
FIG. 14 illustrates and algorithm for Power and VAR flow direction determination.

Power and VAR flow direction is needed to determine the direction of the fault. This can be accomplished by three phase to two phase calculations that allow instant calculation of power and VARs. These are shown in FIG. 14. Line to neutral instantaneous voltages are converted to Vds and Vqs using a Clarke transform. These are then used to calculate Vdr and Vqr in a Park transform. The angle used in the Park transform is developed by adjusting θ to keep Vqr near 0 using a PI regulator. When this is done, Vdr is the magnitude and Vqr can be assumed to be zero. This simplifies the calculations. Normally Power=Vdr*Idr+Vqr*Iqr and VARs=Vdr*Iqr−Vqr*Idr. However, if Vqr is held near 0, the calculation of Power and VARs is simplified as shown in FIG. 14.

θ is then used in the current three phase to rotating two phase conversion as well. When this is done, power (instant) can be calculated as Vdr×Idr. VARs (instant) can be calculated as Vdr times Iqr. These values are instantly correct allowing their use as the voltage is sagging. Because of the transient nature of the disturbance, a filter may be needed.

To decide if the voltage disturbance is in the utility source or the load, the following logic can be used. This logic looks at the magnitude of the voltage sag, and compares it with the magnitude predicted if the sag was caused by the load. If the magnitude of the predicted voltage sag is at least half of the magnitude predicted by the change in current, the fault is in the load and the disconnect switch is left closed. If the fault is determined to not be in the load, the disconnect switch is opened.

Below is code that could be used to make this decision:

```
// This is pseudo code for detecting a downstream fault
// A one line diagram is included in the disclosure
// Positive Idr is current in the direction to supply the load resistor
// Negative Iqr is current in the direction to supply the load inductor
// Theta is the angle that is in phase with the A phase voltage such that
// Vqr is zero. These calculations are not shown, but the algorithm is shown
// in the block diagram.
// Calculations assume counter clockwise rotation, a rinsing, b rising,
// then c rising voltages.
LineImpedanceX = 0.06; // set the line impedance due to inductance to 6% on a 1PU current basis
LineImpedanceR = 0.02; // set the line impedance due to resistance to 2%
LineImpedance = (LineImpedanceX^2 + LineImpedanceR^2)^0.5; // complex sum of the impedances
// Put in the overload capability at the moment. This can be a calculated
// value, or may be a fixed value.
OverLoadX = 1.0; // shown as a fixed value for simplicity
OverLoadR = 0.1; // shown as a fixed value for simplicity
// start with the voltage Clarke transform using the measured
// instant line to neutral voltages Va, Vb, and Vc
// Scaled with Vdr = 1 at 100% voltage
Vds = (2/3 * Va) − (1/3 * (Vb + Vc));
Vqs = 1/3^.5 * (Vb − Vc);
// Now do the Park transform using Theta of the PI regulator shown in the diagram
Vdr = (Vds * Cos(Theta)) + (Vqs * Sin(Theta));
Vqr = (Vqs * Cos(Theta)) − (Vds * Sin(Theta));
// Current Clarke transform using the measured
// instant line currents Ia, Ib, and Ic
// scaled so an output of 1 is 1PU current as used to calculate impedance
Ids = (2/3 * Ia) − (1/3 * (Ib + Ic));
Iqs = 1/3^.5 * (Ib − Ic);
// Now do the Park transform using Theta
Idr = (Ids * Cos(Theta)) + (Iqs * Sin(Theta));
Iqr = (Iqs * Cos(Theta)) − (Ids * Sin(Theta));
FilteredVdr = Lowpass(Vdr);    // Lowpass filter of 1 to 100 seconds typical
FilteredIdr = Lowpass(Idr);    // Lowpass filter with same time constant as Vdr
FilteredIqr = Lowpass(Iqr);    // Lowpass filter with same time constant as Vdr
DeltaVdr = FilteredVdr − Vdr;  // this is the change in Vdr
DeltaIdr = FilteredIdr − Idr;  // this is the change in Idr
DeltaIqr = FilteredIqr − Iqr;  // this is the change in Iqr
DvFromIdr = DeltaIdr * LineImpedanceR;   // expected voltage drop from real power increase in load
DvFromIqr = −DeltaIqr * LineImpedanceS;  // expected voltage drop from reactive power increase in load
DvTotal = DvFromIdr + DvFromIqr;         // total expected voltage drop
// here is the logic to determine if a fault is downstream.
// VaRms is a half cycle sliding window RMS calculation
FaultIsDownstream = False;
// if any phase is below 90% of nominal votlage and
// the Microgrid, UPS or DES can not supply the increased Power or VAR load
if ( ((VaRms < 0.9) || (VbRms < 0.9) || (VcRms < 0.9))
&& ((DeltaIdr > OverLoadR) || (−DeltaIqr > OverLoadX)) )
    {
if ( DvTotal > (0.5 * DeltaVdr) )         // if the voltage sag can be attributed at least 50%
// to increase in power or Vars in the load
{
FaultIsDownstream = True; // Do not open the switch between the utility and the load
    }
   }
```

The last part of the logic looks at the increased current to see if the DES unit, UPS or microgrid can supply the current with its remaining capability including its overload capability. If the increase in current is less than what the DES unit, microgrid or UPS can supply, then it is OK to disconnect from the utility because the increased current is available. In fact, often an inverter based supply can hold its output voltage constant in the face of changing loads including overloads. This can result in correcting the voltage even with a low level downstream fault.

Figure 15:
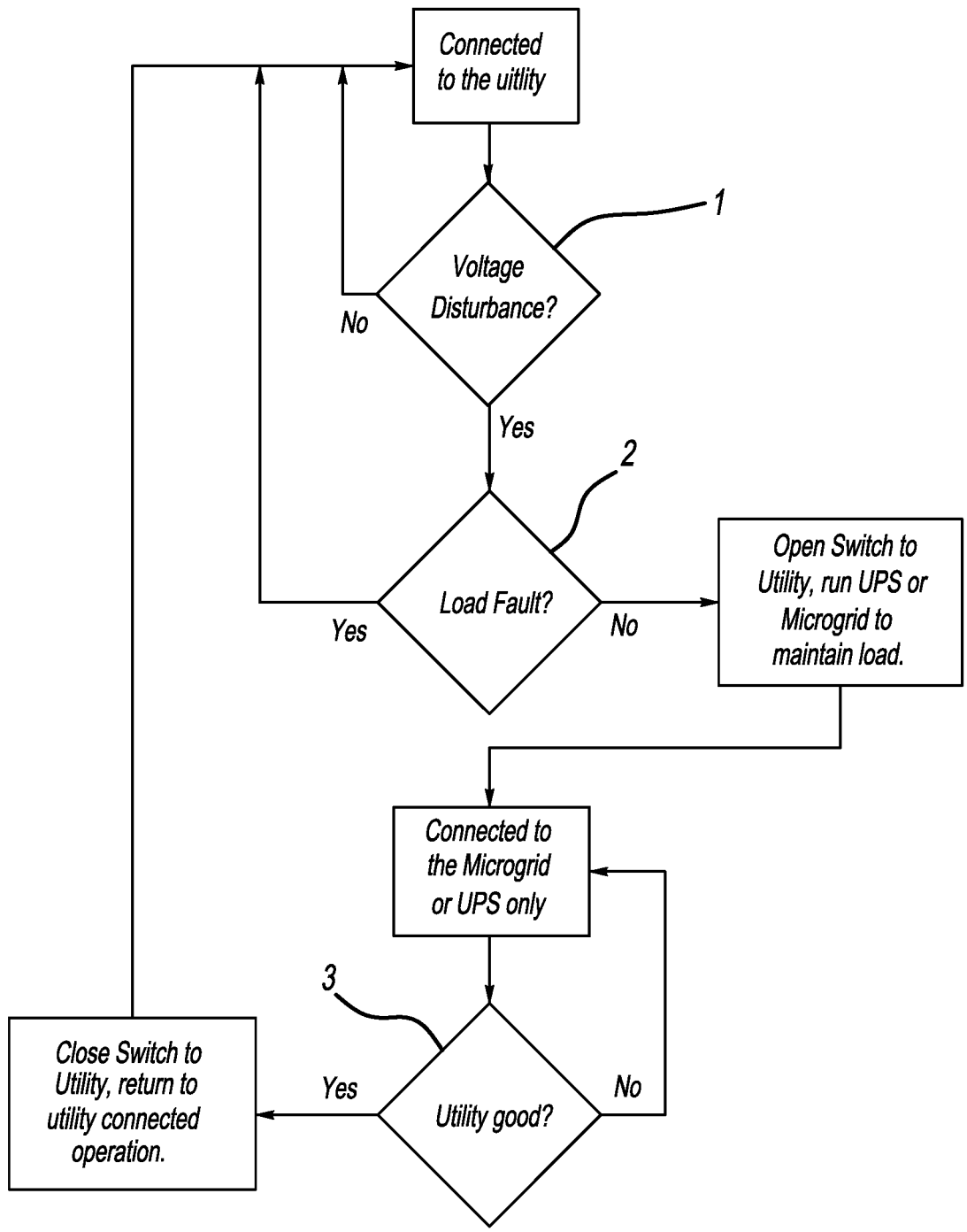
FIG. 15 illustrates a process for opening and closing the disconnect switch of the system depicted in FIG. 13.

FIG. 15 shows a process for opening and closing the utility disconnect switch.

Autonomous Operating Mode

Substation loads for residential customers are somewhat predictable. These loads are affected by the time of day, day of week, and temperature. If a distributed energy storage (DES) system is used to reduce peak loads, the amount of storage required at any given time should be predictable based on these factors. Weekdays tend to be very similar to each other. Weekends and Holidays are likewise similar, but different from weekdays. If the desired discharge and charge profiles are known for past weekdays at a given temperature, the desired discharge for a weekday could follow that profile and be relatively close to the optimal discharge profile, even without a higher system knowledge.

This suggests a way to 'learn' what the optimal discharge and charge profiles would be based on temperature and either weekday or weekend/holiday. It assumes that there is a controller that knows much more about the load on the distribution system than simply the time of day and temperature, and it dispatches the storage in an optimal way based on this much greater level of knowledge.

A DES that is controlled by a central controller such as the HUB may have several arrays of recorded charge and discharge data. These arrays may be two-dimensional but could be further multi-dimensional. For example, they may have the half hour of the day (48) and the ambient temperature in 5° C. increments from −40° C. to 50° C. (18). There may be an array for weekdays and an array for weekends/holidays, or there may be an array for each day of the week and one for holidays.

The array may contain a filtered power level from −1 to 1 per unit (PU) with a typical resolution of 1%. This data can be then stored in less than 1K bytes of data per array. Alternately higher resolution data could be stored, this could double the storage requirements, but would achieve much greater accuracy. For the simplest system with weekdays and weekends/holidays this results in the need for less than 2K bytes of data.

Figure 16:
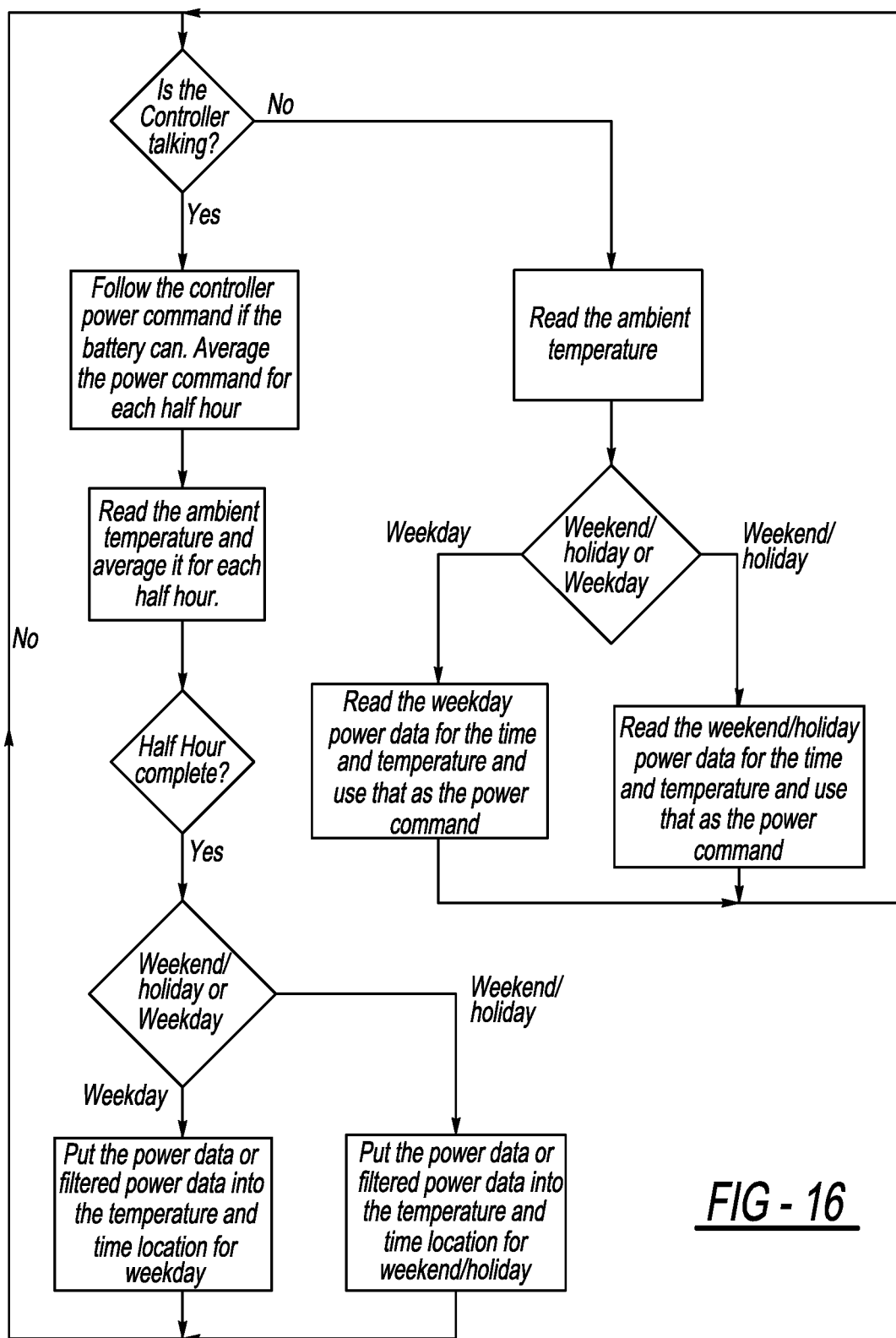
FIG. 16 illustrates a process for autonomous mode operation of a DES unit.

The storage may work as depicted in FIG. 16.

When first deployed, each hour would have a fixed value that is outside the range of −1 to 1 PU. As an example, a value of 1.27 PU might be used as the default for un-modified data.

When the DES is placed in service, the system would start recording data. So if the weekday time was between 0100 and 0130 and the DSS was charging at an average of 25% power for the half hour, while the outside temperature averaged 16° C. for the half hour, the weekday array data for this time and temperature would be changed from 1.27 PU to −0.25 PU. In the next half hour if the system stopped charging, the data for the next half hour and the average temperature during that time would be changed from 1.27 PU to 0.0 PU.

After a few days, there will be some additional data at the same time and temperature. This would be used to modify the existing data in a filtered way. For example, if the filter constant is 0.25 and the new data for the 0100 to 0130 time at 15° C. to 20° C. was charging at 37%, the new array value would be calculated as NewValue=OldValue+(TodaysValue−OldValue)*FilterValue. For the example given, OldValue is −0.25, TodaysValue is −0.37 and FilterValue is 0.25, then NewValue=−0.25+(−0.37−(−0.25))*0.25. This gives a new value of −0.28, or 25% of the way between the old and new values. Over time the array will fill up and will represent the usage of the DSS system.

When communication is lost, the DES will revert to this stored usage value. For example if it is a weekday between 0100 and 0130 and the temperature is between 15° C. and 20° C., the DES will look up its operating point and see that it is −0.28 PU. If the battery can charge, the battery will charge at −0.28 PU until communication is restored. When communication is restored, the DES will follow the commands sent by the controller.

If the data for the time and temperature is 1.27 PU indicating that there is no data for that particular time and temperature, the DES will first look up one temperature step to see if there is data at that temperature. If there is, it will use that data, if not it will look down one temperature step. If there is valid data it will use that data, if not it will look up two temperature steps and so on. If there is no valid data, the system will turn off. Of course, the system could look down temperature data first or it could find the closest temperature to the ambient temperature that has data and use that data. Additional factors could also be used to determine this data like wind speed.

Special Circumstances Operating Modes

The above documented features of DES unit control via a Hub control device describe various, generally regular scenarios for scheduled discharge and charge based upon peak loading and capacity mitigation. For example, the system may be designed to charge the batteries at night when demand is low, and discharge during peak loading, typically during the day. The system is intended to support thousands of DES units managed in dozens to perhaps hundreds of individually-scheduled Groups.

The problem with this approach is that special operating circumstances may arise, e.g, if a storm rolls in, suddenly changing the priority of the system operator. For example, anticipating a storm the system operator may want all DES units charged to their maximum to be ready to back up customers for as long as possible and to be able to reduce load for circuits suddenly reconfigured. An already over-taxed operator may spend significant time reconfiguring for this unexpected event.

Special operating circumstances allow the system to be instantly reconfigured, allowing units to be charged at the maximum rate but subject to all the capacity constraints programmed-in. Since storms can be unpredictable, a quick, reliable reconfiguration feature would reduce the amount of time that the system was off-normal, and increase the comfort level of the operator in switching the system to this off-normal state and then back again.

The Hub therefore may be configured with one or more special circumstances override functions, e.g., a storm anticipation function. Upon activating the "storm anticipation" function, by pressing perhaps a single storm anticipation button, the system operating mode, exclusive of DES units with a local or remote, manual override present, and exclusive of units on feeders or transformers with any, load-side units discharging to address a programmed capacity constraint, will switch to demand-limited charge mode. They will remain in this mode until the system operator switches the special circumstances mode to disabled.

Options can be created to easily override specific (feeder, transformer) capacity constraints. Another option will allow the charging to either override or maintain an external demand limits.

Tables

TABLE 1

Terminology

| Term | Definition |
|---|---|
| Transformer | Specifically, this refers to the station (or substation) transformer supplying the DES fleet. For simplicity it is assumed that one transformer supplies all feeders controlled by the Hub, however those skilled in the art will recognize that more complex arrangements such as parallel-connected transformers can be easily accomodated. Each transformer is outfitted with current and voltage sensing and monitoring, such that the voltage, current, and V-I phase angle/VAR circuit parameters can be accessed by the Hub. This same sensing point provides the measurements of station demand for system-wide energy management. |
| Feeder | The three-phase circuit leading out of the station, and on which the DES Units are deployed. Similar to the Transformer, the feeder has sensing at the station to provide the necessary information on power and VARs. |
| Station | Short for distribution substation—where all of the Hub's feeders typically connect to the transmission source through a step-down transformer, with dedicated circuit breakers at the transformer supply and at the head of each feeder. |
| Fleet | A term for all DES Units controlled by the Hub. For simplicity, it is assumed that one Hub controls all the DES units connected to load served by the substation. |
| Group | A customer-specified means to organize the DES fleet into a collection of Units running the same algorithm with the same settings. Units within a group share settings and to some extent, as a result, are discharged and charged in unison, with proportional variation based upon individual differences in things such as state of charge/discharge, reserve power, unit size, etc. An instance of a group consists of units that are all on the same phase. A group is configured with properties that are identical from phase to phase, but is managed as three, independent instances of the group. In other words, the settings for the group apply uniformly to each of three individual phases, but the dispatching of the units on each phase is independent of dispatching units on either of the other phases. A group must be completely-contained within a zone (see below). |
| Zone | A section of three-phase feeder bounded by electrically-controllable sectionalizing switches. A group must be completely contained in a zone. |
| Demand | The real component of power flow, as measured in watts or multiples thereof. |
| Energy | Power flow integrated over time, as measured in watt-hours or multiples thereof. |

Table 2: Settings and Configuration Variables Used by the HDE

TABLE 2a

Hub Global Settings

| Variable | Description |
|---|---|
| Real Power Dispatch Enable | True (non-zero) if AUTOMATIC control of real power dispatch is enabled. This is a master control enable/disable for the Hub's real power dispatch engine. |
| External Three-Phase Demand Trigger | A setpoint indicating, the maximum amount of demand that this station should attempt to limit itself to. Although this is a setpoint, it is expected to be modified frequently to support the needs of the EMS system. The value is specified and applied as a three phase total. |
| Reactive Power Dispatch Enable | True (non-zero) if AUTOMATIC control of reactive power compensation (RPC) dispatch is enabled. This is a master control enable/disable for the Hub's reactive power dispatch engine. |
| (reference to) Schedule ID for reactive power dispatch | The master schedule to use if reactive power compensation (RPC) dispatch is enabled. During an scheduled active period, the RPC dispatch engine responds to external requests for RPC, and if an external request is not active, then DES RPC dispatch controls each feeder to unity power factor at each feeder breaker. |
| External Three-Phase Reactive Power Compensation | A setpoint indicating an amount of reactive power compensation, in units of KVAR, that should be dispatched from the entire fleet. The value is specified as a three-phase total, but is divided by three before being dispatched in three equal amounts to the DES fleet. |
| Reserve Power Proportional Reduction | A dynamically-adjustable setpoint in the hub that allows for a system-wide proportional decrease in the Reserve Capacity for Islanded Operation. This parameter allows additional |

TABLE 2a-continued

| Hub Global Settings | |
|---|---|
| Variable | Description |
| | energy to be used to relieve an overload situation. The parameter ranges in value from 0 to 1.0, with a default of 1.0 (no reduction). |
| Station Name | A unique identifier of the station in which the Hub operates. Text string. |
| Hub ID | A unique identifier of the Hub Controller. Text string, length TBD. |
| Hub IP Address | The address of the Hub when accessed from the SCADA system. This would be the address of a DNP Device Server providing the interface to the SCADA or DMS system on behalf of the Hub. |
| Hub DNP Address | 16-bit DNP address unique to the Hub within the DNP Device Server |
| Hub DNP Definition | The fully-qualified name of the file containing the XML definition of the DNP implementation for the Hub as seen by the SCADA system. The XML definition is a convenient way to define the DNP points as named variables and to associate the actual DNP point numbers and related information for each named variable. |
| Transformer Three-Phase Demand Trigger Minimum | A setpoint defining the minimum transformer demand for scheduled demand limiting discharge. The equivalent single phase value is determined by dividing by three and the discharge is managed on a per phase basis. During operation, the minimum may be raised if it is determined that there is not enough stored energy to meet the desired transformer loading requirements. |

TABLE 2b

| Feeder-Specific Settings | |
|---|---|
| Variable | Description |
| (list of) Feeders | A repeating group of information associated with each feeder. |
| Feeder Three-Phase Demand Trigger Minimum | Feeder equivalent of Transformer Three-Phase Demand Trigger Minimum |
| Feeder Three-Phase Charge Trigger | A setpoint indicating the maximum desired three-phase demand of the feeder. Note that at the feeder level, maximum demand is specified as a three-phase setpoint but is managed as three, independent per-phase settings on a phase-by-phase basis. |
| Feeder ID | A text string uniquely identifying the feeder, 16 bytes. |
| Feeder Breaker IP Address | Required for data acquisition of feeder demand, voltage, and power factor information. |
| Feeder Breaker DNP Address | Required for data acquisition of feeder demand, voltage, and power factor information. |
| Feeder Breaker DNP Definition | The fully-qualified name of the file containing the XML definition of the DNP implementation for the breaker, including version information and point list with assigned names for use by the application. |

TABLE 2c

| Group settings | |
|---|---|
| Variable | Description |
| (list of) Groups | A repeating group of information about a Group. |
| Group ID | A text string uniquely identifying the Group, 16 bytes. |
| Hub ID | A text string identifying the Hub to which this group is associated. |
| Group Discharge Algorithm | An enumerated value - One of: STANDBY. Units in the group are not in service for discharge. MANUAL DISCHARGE (Discharge rate is user-specified subject only to voltage and other high-priority overrides). SCHEDULED FIXED DISCHARGE POWER PRIORITY (discharge according to the "Fixed Discharge Schedule and settings", limiting time if energy is low). SCHEDULED FIXED DISCHARGE DURATION PRIORITY (discharge according to the "Fixed Discharge Schedule and settings", limiting discharge rate if energy is low). DEMAND LIMITING SCHEDULE (see algorithm in text). |
| (reference to) Schedule ID for fixed discharge | This points to the relevant schedule for discharge of the Group if it is scheduled for fixed discharge. |
| Fixed Discharge Rate | If this group is using fixed discharge scheduling, this is the total desired discharge rate in KW for the group. Note that this may be reduced during operation due to capacity limitations within the group (see available discharge rate below). |

TABLE 2c-continued

Group settings

| Variable | Description |
|---|---|
| (reference to) Schedule ID for demand limited discharge | If the group is being scheduled using Demand Limiting discharge, this points to the relevant schedule. |
| Group Charge Algorithm | An enumerated value - One of: STANDBY. Units in the group are not in service for charging. SCHEDULED FIXED CHARGE (charge according to the "Fixed charge schedule and settings", DEMAND LIMITING SCHEDULE (see algorithm in text). |
| (reference to) Schedule ID for fixed charging | If the group is being scheduled using the Fixed charge algorithms, this points to the relevant schedule. |
| Fixed Charge Rate | If the group is configured to charge with a fixed charge rate, this is the total desired charge rate in KW for the group. Note that this may be reduced during operation due to capacity limitations within the group (see available charge rate below). |
| (reference to) Schedule ID for Demand Limiting Charge | If the group is being scheduled using Demand Limiting charge, this points to the relevant schedule. |
| (list of) Schedules | This is a repeating group specifying the time period during which the scheduled algorithm can be active. Note: The schedule structure is shared by all of the charge and discharge algorithms including reactive power compensation. Therefore not all parameters are used by all scheduling algorithms. Each table row contains separate columns to support unique time periods on each day of the week, plus an additional holiday/weekend entry. Each DES Group's fixed discharge schedule, for example, a single row of the repeating group, contains all of the data elements relevant to each calendar day of the week, plus one additional entry for holidays, total of 8 entries. Any scheduled active period that spans midnight can continue into the following calendar day. |
| Schedule ID | A unique string identifying the schedule. Schedules may be re-used for different groups, and a schedule can contain configured parameters for differing algorithms, but only one set of parameters for a charge algorithm, or one set of parameters for a discharge algorithm, can be actively in use at one time. |
| Algorithm Type | Category of algorithm this schedule is to be used for. Either "Charge", "Discharge", or "RPC" should be specified. |
| Algorithm | For charging algorithms, this is either "Fixed Charge" or "Demand Limited". For discharge algorithms, this is either Fixed Discharge" or "Demand Limited Discharge". This field is ignored for RPC. |
| Start Time | In schedules, the time within a single day when the scheduled algorithm becomes active, specified in hours (0-23) and minutes (0-59) past midnight. |
| Ramp Up Time | (Applicable to fixed discharge/charge schedules only) the amount of time (in minutes) during which charge/discharge power should be ramped, linearly, between zero and the predetermined output level (Discharge/Charge Rate). Note that if the output level is reduced due to capacity limitations in the Units, the effective ramping rate will be reduced but the time should remain as specified. This also applies to ramping down. |
| Duration | The amount of time (in minutes) during which charge/discharge is to remain at the predetermined Charge/Discharge Rate. Excludes ramp up and ramp down times. For demand limited charge/discharge, and for RPC, this is the total amount of time the algorithm is to be applied. |
| Ramp Down Time | (Applicable to fixed discharge/charge schedules only) The amount of time (in minutes) during which power should be ramped down, linearly, from the predetermined output level to zero. Note that if the output level is reduced due to capacity limitations in the Units, the effective ramping rate will be reduced but the time should remain as specified. |

TABLE 2d

DES Unit-specific settings

| Variable | Stored in Unit? ✓ = Yes, ✓ = RO from Hub[1] | Description |
|---|---|---|
| Unit ID | ✓ | A 16, alphanumeric character name to identify the unit to the system. |
| DNP Address | ✓ | The DNP address of the DES Unit |
| IP Address | ✓ | IPv4 address of the DES Unit. |
| Unit DNP Definition | | The fully-qualified name of the file containing the XML definition of the DNP implementation for the DES Unit, including version information and point list with assigned names for use by the application. Note: This file could be stored in the DES Unit and made available on demand. |
| Maximum Rated Discharge | ✓ | The nameplate rating value for the maximum discharge rate, in kVA, that the Unit is engineered to produce. Note that when maximum real power output is required, reactive power output is zero, and the nameplate kVA rating of the unit is also equal to its maximum real power output as measured in kW. |

TABLE 2d-continued

DES Unit-specific settings

| Variable | Stored in Unit? ✓ = Yes, ✓ = RO from Hub[1] | Description |
|---|---|---|
| Group Assignment | | The number of the Group (8-bit unsigned integer) this unit is assigned to. |
| Phase | ✓ | An enumeration of the identification of which feeder phase a DES Unit is connected-to. |
| Reserve Capacity for Islanded Operation | ✓ | The amount of capacity, in percent, that is reserved for operation in Islanded mode. This capacity does not include a second, smaller percentage of capacity reserved for Depleted Battery Reserve (see below). |
| Depleted Battery Reserve | ✓ | A percentage of energy storage capacity (kWH), that is not to be used for either Islanded Operation or any overload reduction. This energy is left in the battery to insure that the unit can withstand long periods of outage without completely draining the battery and risking possible damage. |
| Reliability Reserve | ✓ | A percentage of energy storage capacity (kWH), that is not to be stored for either Islanded Operation or any demand reduction. When charging, this amount of energy is left out of the battery to insure that the unit can act to reduce voltage when necessary. For example, during periods of peak demand, it is possible, for a Unit near a source of supply to find its line voltage excessively-high. In this circumstance the unit should use that excess to charge its batteries to reduce voltage. |

[1]RO from Hub means that the value may not be sent from the Hub to the DES Unit. The data may be entered in the database, but may be superseded (replaced) when the Hub updates its information about the unit.

TABLE 3a

HDE-calculated global variables used in the disclosure

| Variable | Description |
|---|---|
| transformer per-phase demand trigger | This is the demand limit for load following and is equal to ⅓ of the actual measured three phase transformer demand at the start time (Demand Limiting Start Time) unless the demand at that time is less than the Transformer Three-Phase Demand Trigger Minimum. Each phase will be managed independently with the intent to maintain this demand. |
| corrected transformer per-phase demand | This is the measured demand, in KW, per phase, at the station transformer, with the present amount of DES discharge on the same phase having been added. The corrected value should closely represent the demand that would be present without DES units in service. |
| corrected external three-phase demand | This is the sum of corrected transformer per-phase demand over all phases. |
| unsatisfied transformer overload | A sum over all Units on a given phase in a station, of transformer demand that cannot be satisfied by discharging Units on feeders that are under capacity. |

TABLE 3b

Hub Feeder-Specific Calculated Variables

| Variable | Description |
|---|---|
| feeder per-phase demand trigger | Feeder Equivalent of transformer per-phase demand trigger. |
| feeder per-phase demand | This is the measured demand, in KW, per phase, at the head of the feeder. |
| corrected feeder per-phase demand | This is the measured demand, in KW, per phase, at the head of the feeder, with the present amount of DES discharge having been added. The corrected value should closely represent the demand that would be present without DES units in service. |
| feeder per-phase charge trigger | Feeder Three-Phase Charge Trigger setpoint divided by three. |
| per-phase aggregated discharge level | This variable holds a simple sum of the aggregated percentage discharge of all DES Units. This is calculated during charging and is used to establish the proportionate discharge which is applied to requests for demand, in kW, for charging Units. |

TABLE 3c

Hub Group-Specific Calculated Variables

| Variable | Description |
|---|---|
| available discharge rate | For a Group configured for fixed, scheduled discharge, the actual, amount of real power, in KW, that can be cumulatively-supplied by the group in real-time. |

TABLE 3d

Hub Unit-Specific Calculated Values

| Variable | Description |
|---|---|
| fixed discharge rate*** | For a member of a Group configured for fixed, scheduled discharge, this is the discharge rate, in KW, assigned to this member in real-time. |

TABLE 3d-continued

Hub Unit-Specific Calculated Values

| Variable | Description |
|---|---|
| manual contribution*** | For DES units that are in a manual override state, this is their actual discharge rate in KW. This value is read from each DES Unit. |
| scheduled maximum discharge level | During evaluation of energy discharge or charging requirements, this variable contains each unit's maximum, dispatchable output in KW limited by such factors as whether or not its group is scheduled to be available for discharging, whether the feeder, transformer or station is above its capacity limitations, and other similar factors. As discussed in the text, this value is based on unit energy and power ratings, state of charge, reliability reserve, depleted battery reserve, and reserve scaling factors. This value does not reflect voltage or power constraints which may also affect the maximum contribution that an individual unit may make. |
| final discharge rate*** | During an evaluation interval, this is the discharge rate, in kW that will be sent to the Unit from the Hub. |
| final charge rate*** | During an evaluation interval, this is the charge rate, in kW that will be sent to the Unit from the Hub. The actual amount of energy stored in the battery, based on this level of power draw will vary based on the battery's ability to store charge. |
| allocation to feeder overload | For any phase on any feeder that is operating in an overloaded condition, this is the scheduled, available capacity that is allocated to reducing the demand. It is proportioned equally based upon Unit size, in KW, over all Units on the feeder phase. |
| allocation to transformer overload | For any phase on the transformer that is operating in an overloaded condition, this is the scheduled, available capacity that is allocated to reducing the demand from feeders that are not overloaded. It is proportioned equally based upon Unit size, in KW. |
| allocation to transformer overload from overloaded feeders | For any phase on the transformer that is operating in an overloaded condition, this is the scheduled, available capacity that is allocated to reducing the demand from feeders that are overloaded. It is proportioned equally based upon Unit size, in KW, over all Units on the appropriate phase and feeder. |
| allocation to external station demand reduction | The amount of demand to be discharged from each DES Unit to satisfy demand reduction requested from an external source. The demand is satisfied by each unit in proportion to its ability to satisfy the requirement, after all other demand requirements have been satisfied. |
| dispatchable capacity | The amount, in kWH, of available capacity of the unit which can be dispatched to meet peak shaving requirements or utilized for reactive power management. This value excludes the reserve for islanding, depleted battery reserve, or reliability reserve. |
| per-phase scheduled maximum contribution | For a given feeder phase, this variable holds each unit's nameplate-rated maximum contribution to demand reduction or to charge restoration (energy storage). |
| per-phase dispatchable charging demand | For a given feeder phase, this variable holds the amount of demand, in kW, that is available to be allocated for dispatchable (neither fixed or manually-controlled) charging of Units. |

***These variables contain the Hub's allocation of the DES energy discharge, in KW, to each individual DES Unit.

TABLE 4a

DNP Communication Interface: DES Unit Analog Input Points

| Point # | Description | Access | Units | Type | Comments |
|---|---|---|---|---|---|
| 0 | Line1Volts | Read | Volts * 100 | INT16 | VAC RMS as measured from L1-N |
| 1 | Line2Volts | Read | Volts * 100 | INT16 | VAC RMS as measured from L2-N |
| 2 | XfmrPrimaryVoltageEst | Read | Volts * 100 | INT16 | Transformer Primary-Side Voltage Estimate, based on secondary side voltage +/− the drop/rise due to current through the impedance of the transformer, reported on a 120 VAC nominal scale basis. |
| 3 | Line Power | Read | kWatts * 10 | INT16 | With the scale factor in the MCU set as positive the following sign convention applies<br>+for Watts from grid to load/battery (charging/consuming)<br>−for Watts from generation/battery to grid (discharging/producing) |
| 4 | Line Vars | Read | kVARs * 10 | INT16 | With the scale factor in the MCU set as positive the following sign convention applies<br>+for capacitive VARs<br>−for inductive VARs |
| 5 | DES Storage Power | Read | kWatts * 10 | INT16 | With the scale factor in the MCU set as positive the following sign convention applies<br>+for Watts from battery to grid/load (discharging)<br>−for Watts from grid to battery (charging) |
| 6 | DES Storage Vars | Read | kVARs * 10 | INT16 | With the scale factor in the MCU set as positive the following sign convention applies<br>+for producing/capacitive VARs from DES Storage<br>−for consuming/inductive VARs from DES Storage |
| 7 | Battery State Of Charge | Read | % * 10 | UINT16 | Battery State Of Charge |
| 8 | Islanded Duration | Read | minutes | UINT16 | Duration of presently Active Islanding operation (0 if Islanding is Inactive) |
| 9 | AvailableEnergy | Read | kWH * 100 | UINT16 | The amount of stored energy in kilo-watt-hours available for dispatchable discharge. This is exclusive of charge reserved for backup/islanding. Range is 0-2500 for 25 kWH battery, 0-10,000 for a 100 kWH battery, |

TABLE 4a-continued

DNP Communication Interface: DES Unit Analog Input Points

| Point # | Description | Access | Units | Type | Comments |
|---|---|---|---|---|---|
| 10 | PercentAvailableEnergy | Read | % * 10 | UINT16 | The amount of stored energy as a percentage of the unit rating available for dispatchable discharge. This is exclusive of charge reserved for backup/islanding. |

TABLE 4b

DNP Communication Interface: DES Unit Analog Output Points

| point # | description | access | type | format | Comments | Limits |
|---|---|---|---|---|---|---|
| 0 | RealPowerSetpoint | R/W | kWatts × 100 | INT16 | With the scale factor in the MCU set as positive the following sign convention applies<br>+ for Watts from battery to grid/load (discharging)<br>− for Watts from grid to battery (charging) | Active over the range of −25 kW to +25 kW, A setting of 2500 will set the output to 25 kW |
| 1 | ReactivePowerSetpoint | R/W | kVAR × 100 | INT16 | With the scale factor in the MCU set as positive the following sign convention applies<br>+ for producing/capacitive VARs from DES STORAGE<br>− for consuming/inductive VARs from DES STORAGE | Active over the range of −25 kVAR to 25 kVAR, A setting of 2500 will set the output to 25 kVAr |
| 2 | MaxSOC | R/W | % * 10 | INT16 | The maximum state of charge for protection of the battery during peak-shaving/dispatched-power operation. | 0-100.0, default = 100.0% |
| 3 | DepletedChargeReserve (a.k.a. MinSOC) | R/W | % * 10 | INT16 | The minimum state of charge for self protection and extended outage recovery. | 0-100.0, default = 1.0% |
| 4 | BackupReserve (a.k.a. MinSOC-CS) | R/W | % *10 | INT16 | Charge reserved for providing backup power. This is the lowest the SOC will be allowed to go when discharging in non-islanded current-source operation. | 0-100.0, default = 20.0% |
| 5 | BackupReserveScaleFactor | R/W | % * 10 | INT16 | This is a scale factor applied to point #4 (BackupReserve) to reduce the BackupReserve. A value of 100.0 indicates no reduction in the BackupReserve, a value of 0 would indicate reduction of the BackupReserve to 0% | 0-100.0, default = 100.0% |

TABLE 4c

DNP Communication Interface: DES Unit Digital Input Points

| point # | description | access | format | Comments |
|---|---|---|---|---|
| 0 | Enabled | Read | Bit | Set if the system is presently enabled |
| 1 | LocalMode | Read | Bit | Set if the system is presently switched to local control mode (versus remote/SCADA control mode) |
| 2 | Running in Islanded Mode | Read | Bit | Turned on when the Unit has moved to islanded mode because of a loss of synchronism, voltage disturbance, or manual request |
| 3 | LocalSettingChange | Read | Bit | Set if a setting change has been entered and activated locally. The purpose is to inform the Hub that it's unit settings database must be updated. |
| 4 | LocalUserLoggedIn | Read | Bit | Set if a local user has logged in to the DES unit, Cleared on logout and/or timeout. |
| 5 | RemoteUserLoggedIn | Read | Bit | Set if a remote user has logged in via the SCADA/DNP interface, Cleared on logout and/or timeout |
| 6 | DSP Comms Error | Read | Bit | Set on communications Timeout from DSP to MCU (MCU watches for change in UnixTime value from DSP and set/clears based on difference between present value and MCU UnixTime, using a threshold). |
| 7 | AcBreakerState | Read | Bit | 0 - indicates open<br>1 - indicates closed |
| 8 | DcBreakerState | Read | Bit | 0 - indicates open<br>1 - indicates closed |
| 9 | SetpointNotAccepted | Read | Bit | 0 - Setpoint good<br>1 - Setpoint not good |
| 10 | Spare | | | Spare |
| 11 | Spare | | | Spare |
| 12 | Spare | | | Spare |
| 13 | Spare | | | Spare |

TABLE 4c-continued

DNP Communication Interface: DES Unit Digital Input Points

| point # | description | access | format | Comments |
|---|---|---|---|---|
| 14 | Spare | | | Spare |
| 15 | Spare | | | Spare |
| 16 | Information Alarm | Read | Bit | Set if there are any informational alarms active in the system |
| 17 | Warning Alarm | Read | Bit | Set if there are any warning alarms active in the system |
| 18 | Inhibit Alarm | Read | Bit | Set if there are any inhibit alarms active in the system |
| 19 | Isolate Alarm | Read | Bit | Set if there are any isolate alarms active in the system |
| 20 | Trip Offline Alarm | Read | Bit | Set if there are any trip offline alarms active in the system |
| 21 | Self Reset Alarm | Read | Bit | Set if there are any self reset alarms active in the system |
| 22 | Auto Reset Alarm | Read | Bit | Set if there are any auto reset alarms active in the system |
| 23 | Manual Reset Alarm | Read | Bit | Set if there are any manual reset alarms active in the system |
| 24 | ParameterCalibrationChange Activation | Read | Bit | Set if this alarm is active |
| 25 | ExecutionTimeOverrun | Read | Bit | Set if this alarm is active |
| 26 | ParameterCalibrationNvError | Read | Bit | Set if this alarm is active |
| 27 | AnyAppBrdPwrSupplyUV | Read | Bit | Set if this alarm is active |
| 28 | McuCommsError | Read | Bit | Set if this alarm is active |
| 29 | ManualReset | Read | Bit | Set if this alarm is active |
| 30 | AutoReset | Read | Bit | Set if this alarm is active |
| 31 | Emergency Stop | Read | Bit | Set if this alarm is active |
| 32 | AllPhaseLegsTripped | Read | Bit | Set if this alarm is active |
| 33 | UdmOverVoltage | Read | Bit | Set if this alarm is active |
| 34 | UdmUnderVoltage | Read | Bit | Set if this alarm is active |
| 35 | SystemDisable | Read | Bit | Set if this alarm is active |
| 36 | AutoResetLockout | Read | Bit | Set if this alarm is active |
| 37 | ScadaCommError | Read | Bit | Set if this alarm is active |
| 38 | DcLinkDissipatorInstalled | Read | Bit | Set if this alarm is active |
| 39 | Spare15 | Read | Bit | Set if this alarm is active |
| 40 | IgbtGateDriveUVLine1 | Read | Bit | Set if this alarm is active |
| 41 | InverterCurrentLimitLine1 | Read | Bit | Set if this alarm is active |
| 42 | InverterOCLine1 | Read | Bit | Set if this alarm is active |
| 43 | IgbtOvertemperatureWarnLine1 | Read | Bit | Set if this alarm is active |
| 44 | IgbtOvertemperatureTripLine1 | Read | Bit | Set if this alarm is active |
| 45 | Spare21 | Read | Bit | Set if this alarm is active |
| 46 | Spare22 | Read | Bit | Set if this alarm is active |
| 47 | Spare23 | Read | Bit | Set if this alarm is active |
| 48 | IgbtGateDriveUVLine2 | Read | Bit | Set if this alarm is active |
| 49 | InverterCurrentLimitLine2 | Read | Bit | Set if this alarm is active |
| 50 | InverterOCLine2 | Read | Bit | Set if this alarm is active |
| 51 | IgbtOvertemperatureWarnLine2 | Read | Bit | Set if this alarm is active |
| 52 | IgbtOvertemperatureTripLine2 | Read | Bit | Set if this alarm is active |
| 53 | Spare29 | Read | Bit | Set if this alarm is active |
| 54 | Spare30 | Read | Bit | Set if this alarm is active |
| 55 | Spare31 | Read | Bit | Set if this alarm is active |
| 56 | AcBreakerUnsuccessfulClose Attempt | Read | Bit | Set if this alarm is active |
| 57 | AcBreakerUnsuccessfulOpen Attempt | Read | Bit | Set if this alarm is active |
| 58 | DcBreakerUnsuccessfulClose Attempt | Read | Bit | Set if this alarm is active |
| 59 | DcBreakerUnsuccessfulOpen Attempt | Read | Bit | Set if this alarm is active |
| 60 | VeryOverVoltage | Read | Bit | Set if this alarm is active |
| 61 | OverVoltage | Read | Bit | Set if this alarm is active |
| 62 | UnderVoltage | Read | Bit | Set if this alarm is active |
| 63 | VeryUnderVoltage | Read | Bit | Set if this alarm is active |
| 64 | OverFrequency | Read | Bit | Set if this alarm is active |
| 65 | UnderFrequency | Read | Bit | Set if this alarm is active |
| 66 | VeryUnderFrequency | Read | Bit | Set if this alarm is active |
| 67 | DcLinkOV | Read | Bit | Set if this alarm is active |
| 68 | DcLinkUV | Read | Bit | Set if this alarm is active |
| 69 | DcLinkMidpointUnbalanced | Read | Bit | Set if this alarm is active |
| 70 | IgbtThermistorShorted | Read | Bit | Set if this alarm is active |
| 71 | IgbtThermistorBroken | Read | Bit | Set if this alarm is active |
| 72 | DspFpgaHeartbeatLost | Read | Bit | Set if this alarm is active |
| 73 | AnyBatteryAlarm | Read | Bit | Set if this alarm is active |
| 74 | BatteryOverTemperature | Read | Bit | Set if this alarm is active |
| 75 | BatteryOverVoltage | Read | Bit | Set if this alarm is active |
| 76 | BatteryUnderVoltage | Read | Bit | Set if this alarm is active |
| 77 | BatteryOverCurrent | Read | Bit | Set if this alarm is active |
| 78 | BatteryModuleComms | Read | Bit | Set if this alarm is active |
| 79 | BatteryOilLevelProblem | Read | Bit | Set if this alarm is active |
| 80 | BatteryInterlockStatus | Read | Bit | Set if this alarm is active |
| 81 | BatteryHeaterStatus | Read | Bit | Set if this alarm is active |
| 82 | BatteryBmsComms | Read | Bit | Set if this alarm is active |
| 83 | VsReturnDelayActive | Read | Bit | Set if this alarm is active |
| 84 | DischargeLimitInVsExceeded | Read | Bit | Set if this alarm is active |

TABLE 4c-continued

DNP Communication Interface: DES Unit Digital Input Points

| point # | description | access | format | Comments |
|---|---|---|---|---|
| 85 | InverterOutputLimited | Read | Bit | Set if this alarm is active |
| 86 | WaterInUnit | Read | Bit | Set if this alarm is active |
| 87 | Spare63 | Read | Bit | Set if this alarm is active |

TABLE 4d

DNP Communication Interface: DES Unit Digital Output Points

| point # | description | access | format | Comments |
|---|---|---|---|---|
| 0 | EnableRequest | W | Bit | LatchOn to remotely request automatic operation be enabled<br>LatchOff to remotely request automatic operation be disabled<br>(this request may be overridden locally via a Remote/LocalEnable/LocalDisable selector switch) |
| 1 | ResetAlarms | W | Bit | PulseOn to reset "Manual Reset" alarms<br>(Ignored when the local/remote selector switch is in a local position) |
| 2 | RealPowerClamp | W | Bit | LatchOn to clamp the Real Power setpoint value to a locally defined parameter value<br>LatchOff to follow the RealPowerSetpoint received via SCADA<br>(The locally defined parameter value will typically be zero to effectively disable real power compensation) |
| 3 | ReactivePowerClamp | W | Bit | LatchOn to clamp the ReactivePowerSetpoint value to a locally defined parameter value<br>LatchOff to follow the ReactivePowerSetpoint value received via SCADA<br>(The locally defined parameter value will typically be zero to effectively disable reactive power compensation) |
| 4 | InhibitIslanding | W | Bit | LatchOn to Inhibit both Automatically and Manually Initiated Islanding<br>LatchOff to allow either Automatic or Manual initiation of Islanding |
| 5 | RequestIslanding | W | Bit | LatchOn to Manually Initiated Islanding<br>LatchOff to allow Islanding Return to occur<br>(Upon Battery depletion, return to line if possible) |
| 6 | LocalSettingsChangeAck | W | Bit | PulseOn to Acknowledge (and clear) the LocalSettingChange point, StatusPoint #3 |

TABLE 5

Substation Transformer DNP Point List
Note: All points below are analog points measured on the low voltage output side of the substation transformer

| Point # | Description | Units | Type | Comments |
|---|---|---|---|---|
| 0 | CurrentPhaseA | Amps | INT16 | |
| 1 | CurrentPhaseB | Amps | INT16 | |
| 2 | CurrentPhaseC | Amps | INT16 | |
| 3 | VoltagePhaseA | Volts | INT32 | Line to ground |
| 4 | VoltagePhaseB | Volts | INT32 | |
| 5 | VoltagePhaseC | Volts | INT32 | |
| 6 | RealPowerPhaseA | Watts | INT32 | |
| 7 | RealPowerPhaseB | Watts | INT32 | |
| 8 | RealPowerPhaseC | Watts | INT32 | |
| 9 | ReactivePowerPhaseA | VARs | INT32 | |
| 10 | ReactivePowerPhaseB | VARs | INT32 | |
| 11 | ReactivePowerPhaseC | VARs | INT32 | |
| 12 | TemperaturePhaseA | Deg. C | INT16 | Transformer Hot Spot Temperature |
| 13 | TemperaturePhaseB | Deg. C | INT16 | |
| 14 | TemperaturePhaseC | Deg. C | INT16 | |

TABLE 6

Feeder Breaker DNP Point List
Note: All points below are analog points measured on the input side of the each substation feeder breaker unless otherwise noted

| Point # | Description | Units | Type | Comments |
|---|---|---|---|---|
| 0 | CurrentPhaseA | Amps | INT16 | |
| 1 | CurrentPhaseB | Amps | INT16 | |
| 2 | CurrentPhaseC | Amps | INT16 | |
| 3 | VoltagePhaseA | Volts | INT32 | Line to ground |
| 4 | VoltagePhaseB | Volts | INT32 | |
| 5 | VoltagePhaseC | Volts | INT32 | |
| 6 | RealPowerPhaseA | Watts | INT32 | |
| 7 | RealPowerPhaseB | Watts | INT32 | |
| 8 | RealPowerPhaseC | Watts | INT32 | |
| 9 | ReactivePowerPhaseA | VARs | INT32 | |
| 10 | ReactivePowerPhaseB | VARs | INT32 | |
| 11 | ReactivePowerPhaseC | VARs | INT32 | |
| 12 | RealPowerCapacityPhaseA | Watts | INT32 | From DTS System if available |
| 13 | RealPowerCapacityPhaseB | Watts | INT32 | |
| 14 | RealPowerCapacityPhaseC | Watts | INT32 | |
| 15 | CableTemperaturePhaseA | Deg. C | INT16 | From DTS System if available - highest temp along length |
| 16 | CableTemperaturePhaseB | Deg. C | INT16 | |
| 17 | CableTemperaturePhaseC | Deg. C | INT16 | |

TABLE 7

Example Transformer Emergency Overload Table

| Transformer Hot Spot Temperature (Deg. C.) | Length of Allowable Overload (Hours) | per-phase demand at threshold (kW), (3 values) | per-phase time above threshold (hours), (3 values) | Comment |
|---|---|---|---|---|
| 105 | (infinite) | | | Higest desired temperature within normal range |
| 110 | 24.0 | | | Triggering temperature for overload mitigation |
| 115 | 24.0 | | | |
| 120 | 12.0 | | | |
| 125 | 10.0 | | | |
| 130 | 8.0 | | | |
| 135 | 6.0 | | | |
| 140 | 3.0 | | | |
| 150 | 1.0 | | | |

The invention claimed is:

1. A method of controlling the distribution of energy within an energy distribution system, the energy distribution system a plurality of distributed energy storage units operably disbursed throughout the energy distribution system, the method comprising:
forming groups of distributed energy storage units from the plurality of energy storage units to provide a plurality of groups of energy storage units; and
operably controlling operation of the distributed energy storage units within the groups such that at least charging, discharging or reactive compensation functions of the distributed energy storage units is accomplished on a group basis;
wherein an aggregated output of at least one group is operably controlled such that if a total reactive compensation required is less than an aggregated maximum output of the distributed energy storage units group, the required reactive power output is proportioned relative to a maximum output of the distributed energy storage unit group.

2. The method of claim 1, wherein if at least one group is charging or discharging no other group may be discharging or charging, respectively.

3. The method of claim 1, wherein one or more groups are operably controlled to discharge according to a scheduled fixed discharge rate or a scheduled fixed discharge power.

4. The method of claim 1, wherein one or more groups are operably controlled to charge or discharge, respectively in response to a compensation requirement of the energy distribution system.

5. The method of claim 1, comprising determining an available discharge rate for a group and operably controlling the group to discharge responsive to the available discharge rate.

6. The method of claim 1, wherein one or more groups are operably controlled to discharge to provide a peak shaving or load leveling function.

7. The method of claim 1, wherein one or more groups are operably controlled to charge or discharge to compensate the energy distribution system in accordance with a hierarchy of conditions within the energy distribution system.

8. The method of claim 1, wherein one or more groups are operably controlled to discharge to reduce an overload of a transformer, a feeder or a transformer and a feeder.

9. The method of claim 1, comprising determining a scheduled maximum contribution of all groups to the energy distribution system and allocating a portion of the scheduled maximum contribution to groups of the plurality of groups.

10. An energy distribution system comprising:
a plurality of sources, substations and feeders operably interconnected to form a distribution grid;
a plurality of distributed energy storage units coupled to respective substations and feeders, wherein each distributed energy storage unit is further associated with a group of a plurality of groups of distributed energy storage units; and
a controller communicatively coupled to the distributed energy storage units, the sources, stations and feeders, the controller operable to control a charge, discharge or reactive compensation of distributed energy storage units on a group basis to provide a compensation function to the grid;
wherein the controller is configured to control at least one group of the plurality of groups such that if a total reactive compensation required is less than an aggregate maximum output of the distributed energy storage units in the group, the required reactive power output is proportioned relative to their maximum output.

11. An energy distribution system including a plurality of sources, substations and feeders operably interconnected to form a distribution grid, and a plurality of distributed energy storage units coupled to respective substations and feeders, wherein each distributed energy storage unit is further associated with a group of a plurality of groups of distributed energy storage unit; and a controller, the controller comprising:
at least one communication interface;
a user interface;
an information database; and
a dispatch engine operably coupled to the communication interface, the user interface and the database, the dispatch engine operable to determine a condition of the energy distribution system and to command one or more groups of distributed energy storage units to charge, discharge or provide reactive power as a group to the grid such that if a total reactive compensation required is less than an aggregated maximum output of the distributed energy storage units in the group, the required reactive power output is proportioned relative to their maximum output.

12. The energy distribution system of claim 11, wherein energy distribution system comprises multiple phases and the distributed energy storage units are coupled to respective single phases of the multiple phases.

13. The energy distribution system of claim 11, wherein energy distribution system comprises multiple phases and the distributed energy storage units are coupled to each of the multiple phases.

14. The energy distribution system of claim 11, wherein the dispatch engine comprises one or more charge algorithms and one or more discharge algorithms and the dispatch engine being operable to command a group to charge or discharge in accordance with a selected one of the charge or discharge algorithms.

15. The energy distribution system of claim 14, wherein the discharge algorithms comprise a fixed duration priority discharge algorithm and a fixed power priority discharge algorithm.

16. The method of claim 1, wherein one or more groups are operably controlled to charge or discharge, respectively, in response to a schedule or a condition of the energy distribution system.

17. The method of claim 1, wherein one or more groups are operably controlled to charge or discharge, respectively, in response to a total available discharge rate based upon the available discharge rates of the respective group.

18. The method of claim 1, wherein one or more groups are operably controlled to charge or discharge, respectively, in response to a discharge priority assigned to the respective group.

19. The method of claim 1, wherein one or more groups are operably controlled to charge or discharge, respectively, to preserve an islanding reserve.

20. The method of claim 1, wherein one or more groups are operably controlled to charge or discharge, respectively, in response to an energy cost parameter.

21. The method of claim 1, wherein one or more groups are operably controlled to charge or discharge, respectively in response, to a thermal parameter.

\* \* \* \* \*